United States Patent [19]
Groves

[11] 4,346,452
[45] Aug. 24, 1982

[54] NRZ/BIPHASE MICROCOMPUTER SERIAL COMMUNICATION LOGIC

[75] Inventor: Stanley E. Groves, Round Rock, Tex.

[73] Assignee: Motorola, Inc., Schaumburg, Ill.

[21] Appl. No.: 939,743

[22] Filed: Sep. 5, 1978

[51] Int. Cl.³ .................. G06F 5/00; H04L 27/18
[52] U.S. Cl. ............................ 364/900; 375/8; 375/55; 375/87
[58] Field of Search .............. 178/69.1, 68; 325/38 B, 325/39, 30, 38 R, 40, 141, 163, 150, 130, 321; 364/200 MS File, 900 MS File; 375/8, 55, 87; 360/41, 42

[56] References Cited

U.S. PATENT DOCUMENTS

| | | | |
|---|---|---|---|
| 3,618,031 | 11/1971 | Kennedy | 364/200 |
| 3,760,277 | 9/1973 | Whang | 325/38 A |
| 3,863,025 | 1/1975 | Gonsewski et al. | 178/68 |
| 3,975,712 | 8/1976 | Hepworth et al. | 364/200 |
| 3,983,485 | 9/1976 | Stuart | 325/38 A |
| 3,987,374 | 10/1976 | Jones, Jr. | 325/39 |
| 3,988,676 | 10/1976 | Whang | 325/38 A |
| 4,006,416 | 2/1977 | Pastan | 325/38 A |
| 4,016,548 | 4/1977 | Law et al. | 364/200 |
| 4,038,494 | 7/1977 | Miller et al. | 178/69.1 |
| 4,047,201 | 9/1977 | Kerllenevich | 364/200 |
| 4,066,964 | 1/1978 | Costanza et al. | 343/204 |
| 4,071,887 | 1/1978 | Daly et al. | 364/900 |
| 4,087,855 | 5/1978 | Bennett et al. | 364/200 |

*Primary Examiner*—Gareth D. Shaw
*Assistant Examiner*—David Y. Eng
*Attorney, Agent, or Firm*—Anthony J. Sarli, Jr.; Vincent Ingrassia; Jeffrey Van Myers

[57] ABSTRACT

A single-chip microcomputer comprises a CPU (1), a RAM (2), a ROM (3), a timer (4), serial I/O communication logic (5), and four I/O ports (11-14). The serial I/O communication logic is capable of handling serial communications in either the NRZ or Manchester (biphase) format. The result is more versatile and more reliable serial communications.

4 Claims, 32 Drawing Figures

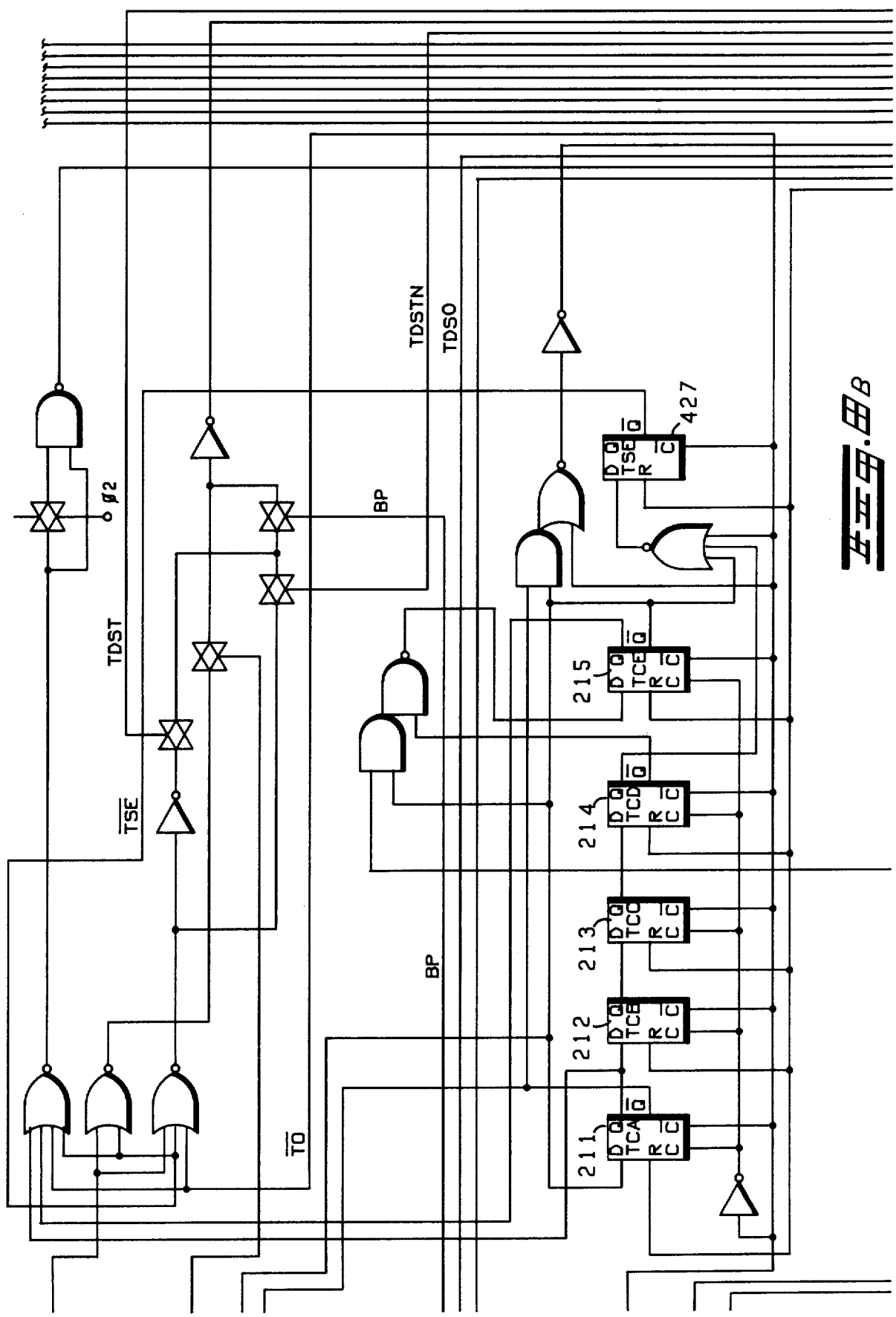

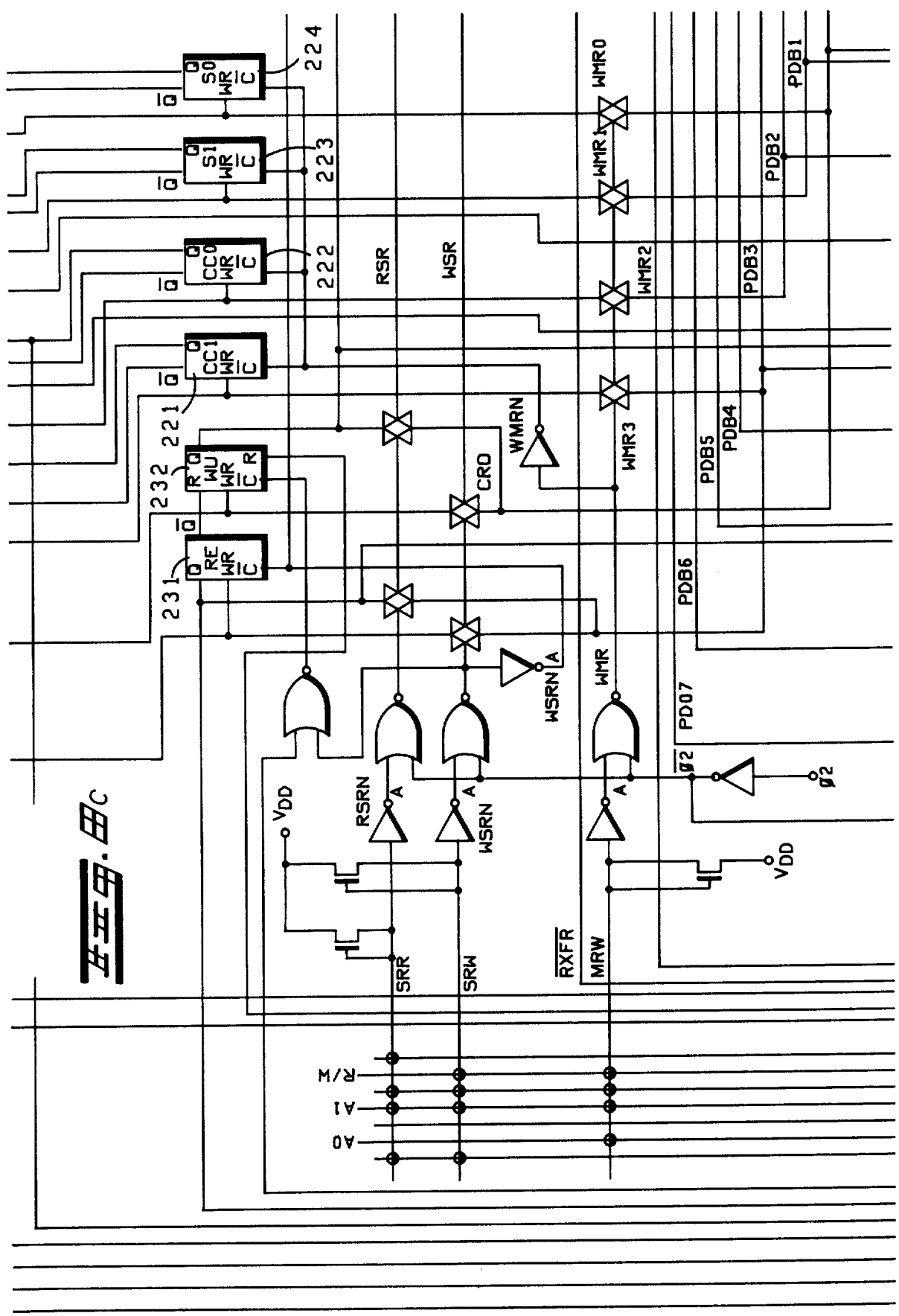

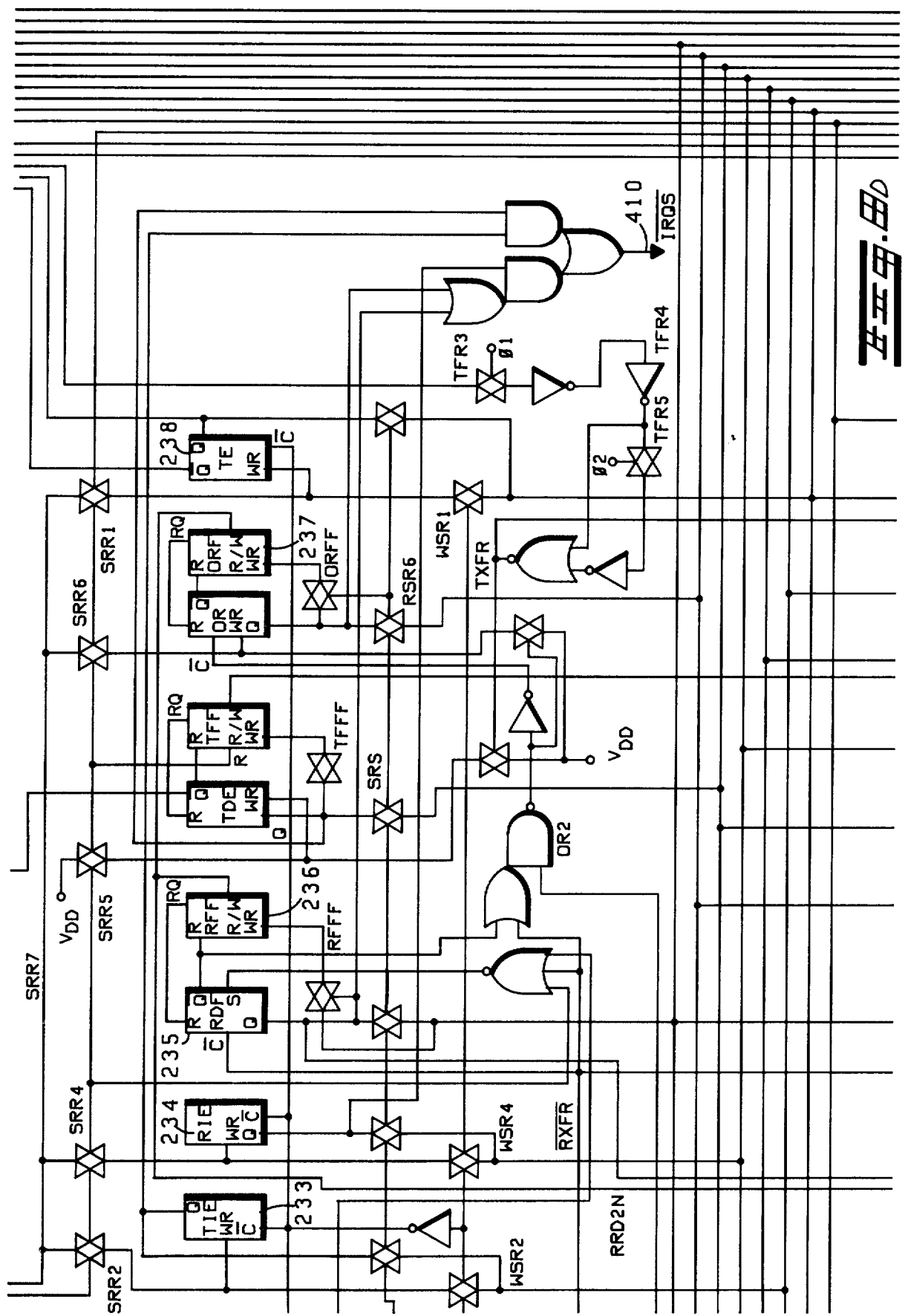

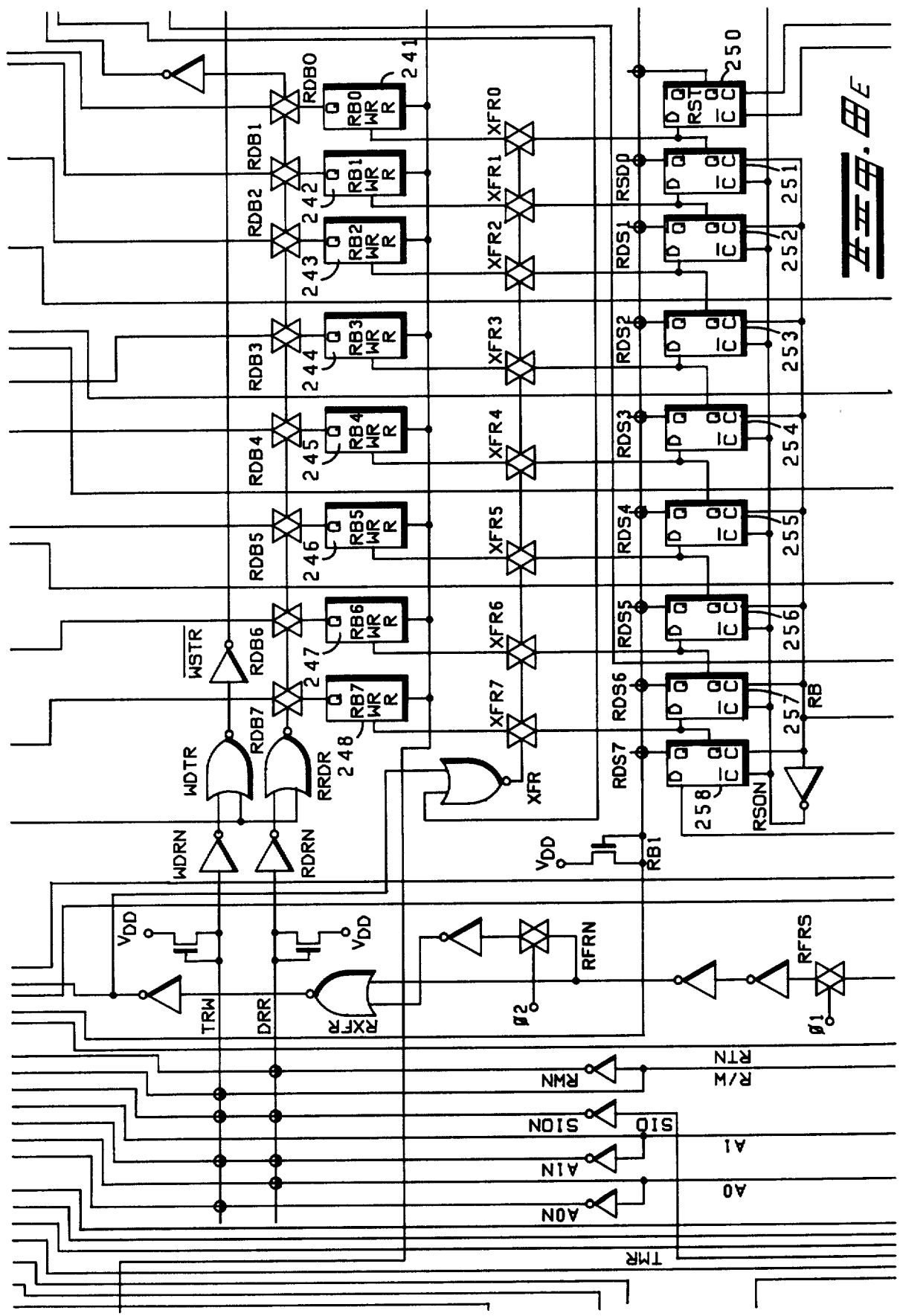

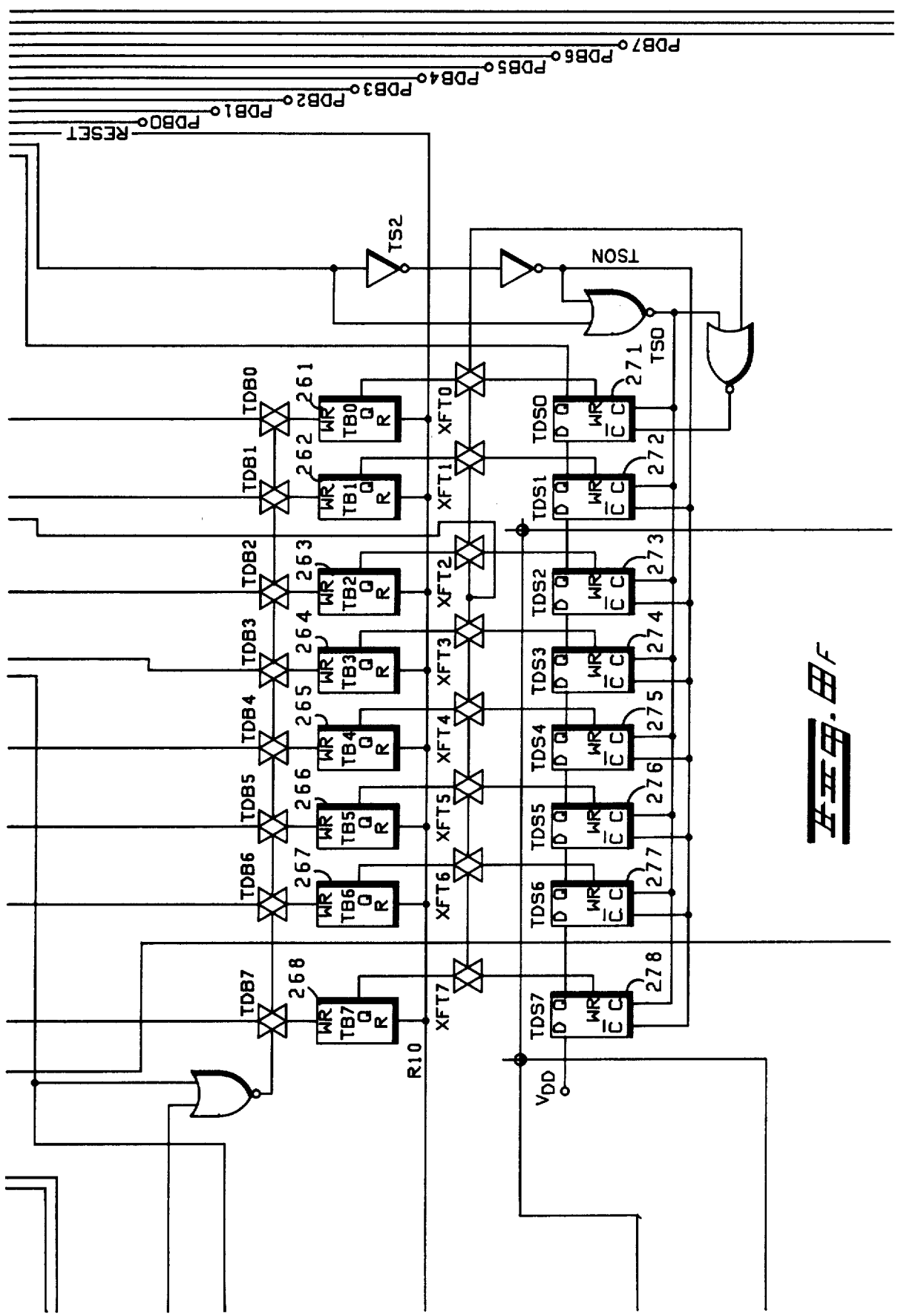

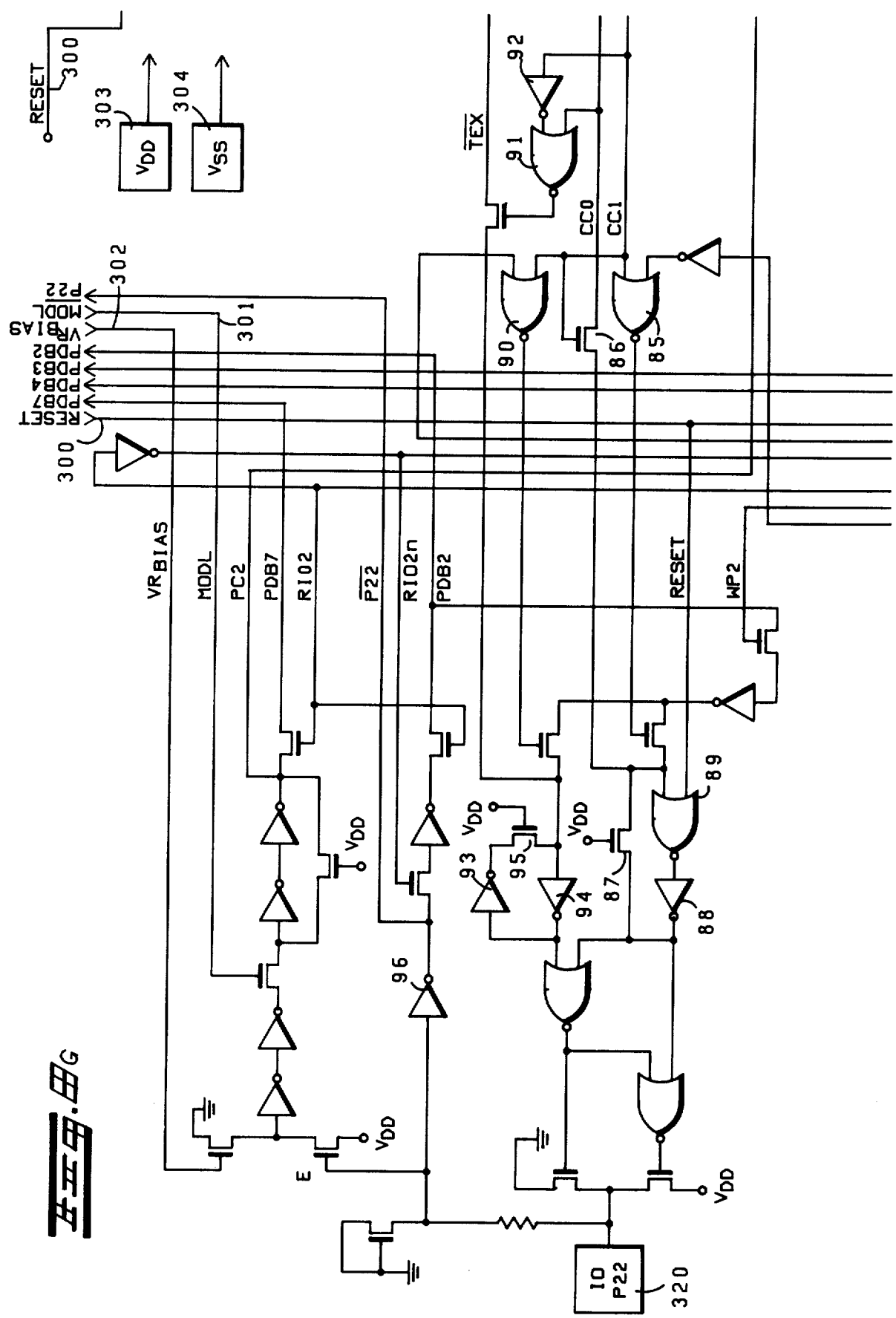

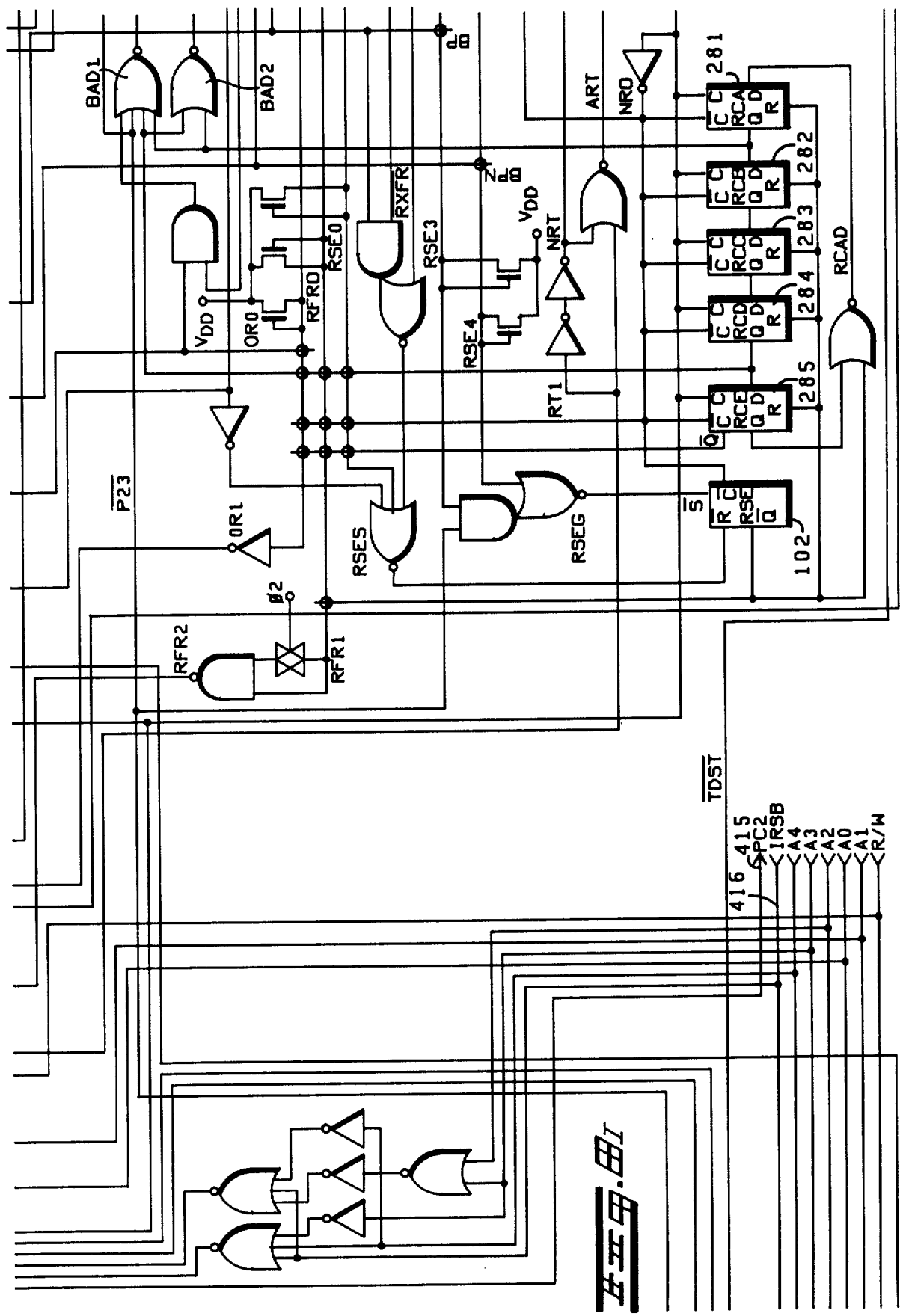

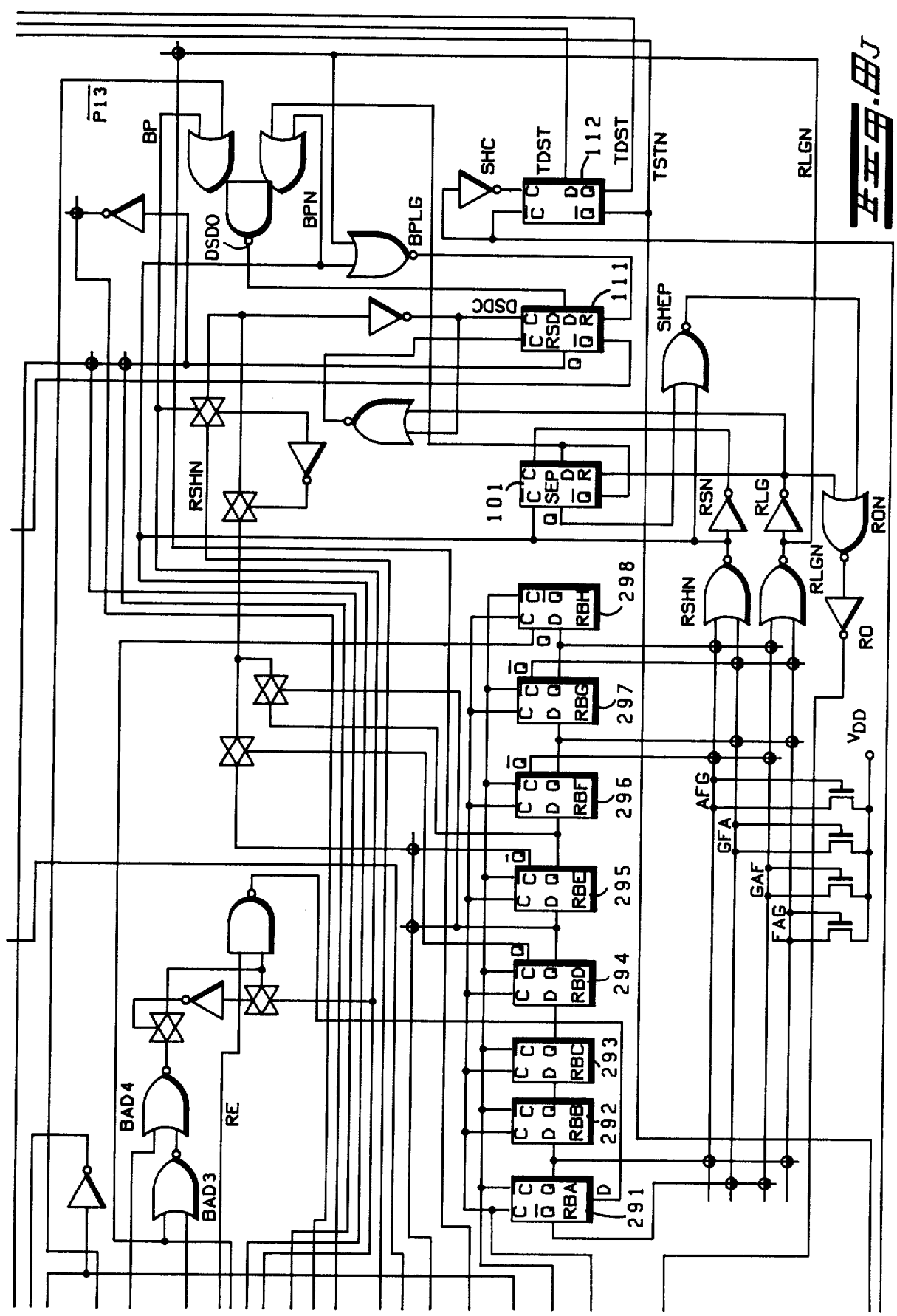

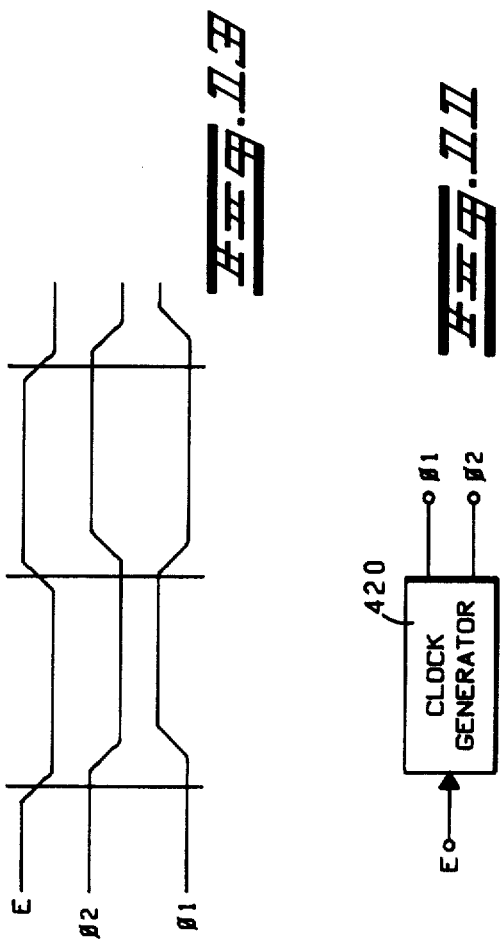
FIG. 11
FIG. 9
| FIG.8A | FIG.8B |
| FIG.8C | FIG.8D |
| FIG.8E | FIG.8F |
| FIG.8I | FIG.8J |
| FIG.8G | |
| FIG.8H | |
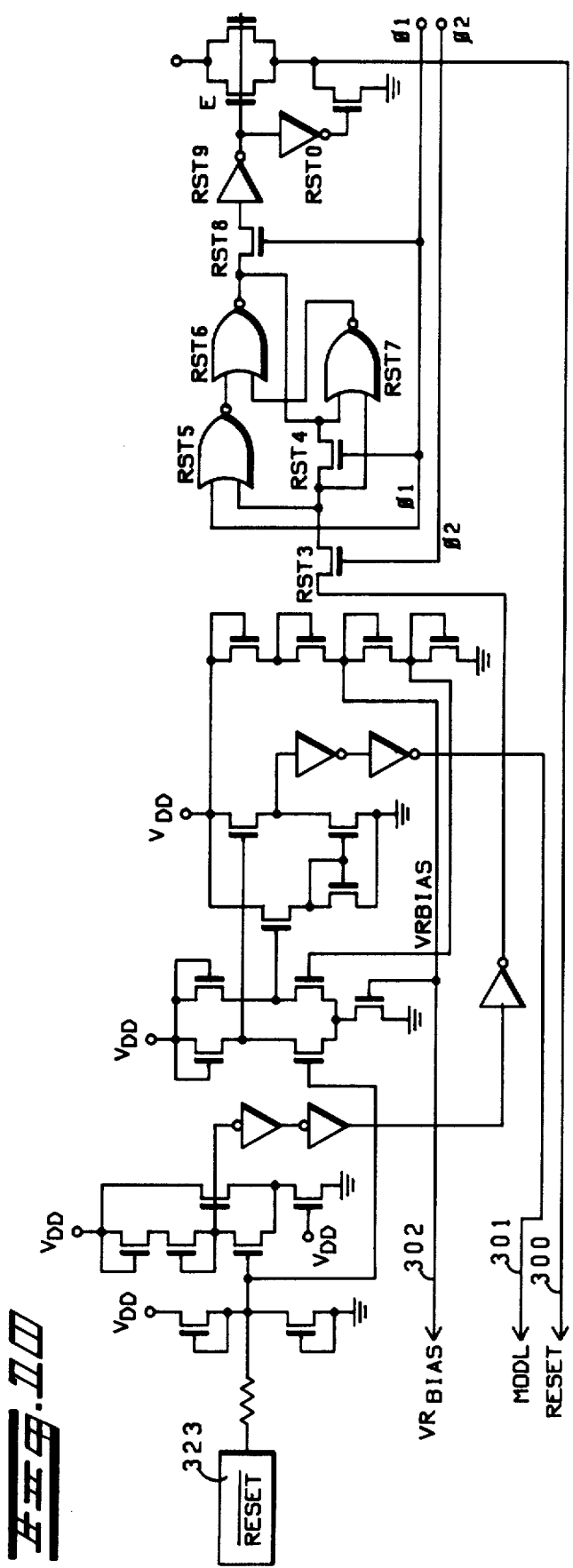
FIG. 10

NRZ/BIPHASE MICROCOMPUTER SERIAL COMMUNICATION LOGIC

RELATED INVENTIONS (1) Ser. No. 872,857, filed Jan. 27, 1978, of Ritter et al entitled Microprocessor and assigned to the assignee of the present invention.

(2) Ser. No. 873,045, filed Jan. 27, 1978 of Wiles et al entitled Microcomputer and assigned to the assignee of the present invention.

(3) Ser. No. 929,636, filed July 31, 1978, of Harrington et al entitled Processor Interrupt System and assigned to the assignee of the present invention.

(4) Ser. No. 929,482, filed Aug. 2, 1978, of Boney et al entitled Fast Interrupt Method and assigned to the assignee of the present invention.

(5) Ser. No. 939,741, filed on even date herewith, of Daniels et al entitled Microprocessor Having Plural Internal Data Buses and assigned to the assignee of the present invention.

(6) Ser. No. 939,744, filed on even date herewith, of Groves entitled Digital Logic For Separating Data and Clock in Manchester-Encoded Data and assigned to the assignee of the present invention.

(7) Ser. No. 939,742, filed on even date herewith, of Groves entitled Microcomputer Wake-Up Logic and assigned to the assignee of the present invention.

(8) Ser. No. 939,724, filed on even date herewith, of Daniels et al entitled Carry Anticipator Circuit and Method and assigned to the assignee of the present invention.

(9) Ser. No. 939,721, filed on even date herewith, of Shaw et al entitled Programmable Mode Select by Reset and assigned to the assignee of the present invention.

(10) Ser. No. 939,725, filed on even date herewith, of Shaw et al entitled FET Voltage Level Detecting Circuit and assigned to the assignee of the present invention.

(11) Ser. No. 939,722, filed on even date herewith, of Daniels et al entitled Data Processor Having Single Clock Pin and assigned to the assignee of the present invention.

(12) Ser. No. 939,723, filed on even date herewith, of Daniels et al entitled Valid Memory Address Pin Elimination and assigned to the assignee of the present invention.

(13) Ser. No. 921,012, filed June 30, 1978, of Kyu et al entitled Advanced Data Link Controller and assigned to the assignee of the present invention.

TECHNICAL FIELD

This invention relates generally to the field of data processing and, more particularly, to the serial I/O communication logic of a single-chip microcomputer.

BACKGROUND ART

Microcomputers are sophisticated, general purpose logic devices which can be programmed to perform a wide variety of useful control functions in industrial and communications equipment, large-scale and medium-scale computer peripheral and terminal hardware, automobiles and other transportation media, amusement and educational devices, and the like.

Microcomputers are being used increasingly to control serial data communications between data processing terminals, modems, and processors. Serial data communications between terminals or modems primarily utilizes NRZ (non-return-to-zero) encoding, whereas serial communications between processors primarily utilizes biphase encoding. Particularly, as distributed processing systems become increasingly important, such as in the automotive environment, it also becomes increasingly important to provide a microcomputer with the capability of handling the highly reliable biphase format, which can tolerate a much greater mismatch between transmitter and receiver clocks.

As the unit cost of microcomputers decreases, these devices are becoming more and more attractive for controlling serial data communications of all types. It would be highly desirable to provide a microcomputer with the capability of utilizing both NRZ and biphase protocols. However, in designing a microcomputer which can be sold at a competitive price it is mandatory that the on-chip logic be minimized to the greatest extent possible, since yields are inversely proportional to the chip size. There is a need therefore for a microcomputer serial I/O communication logic which can accommodate both NRZ and biphase encoding, yet which requires a minimum of logic to be implemented.

BRIEF SUMMARY OF THE INVENTION

It is an object of the present invention to provide improved serial I/O communication logic in a single-chip microcomputer.

It is another object of the present invention to provide in a single-chip microcomputer serial I/O communication logic capable of handling both NRZ and biphase formats.

These and other objects of the invention are achieved in accordance with a preferred embodiment of the invention by providing a microcomputer having serial I/O communication logic, the communication logic including means for transmitting and receiving serial information in NRZ-encoded format, and means for transmitting and receiving serial information in biphase-encoded format.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 8A–8J constitute a detailed logic diagram for the serial I/O communication logic of the present invention.

FIG. 9 shows the interconnection of the individual drawings of FIGS. 8A-8J.

FIG. 10 shows an additional detailed logic diagram for generating signals utilized within the logic circuitry illustrated in FIGS. 8A-8J.

FIG. 11 is a schematic representation of the generation of the φ1 and φ2 internal microcomputer clocks from the master E clock input.

FIG. 13 illustrates the relationship between the internal clocks φ1 and φ2 and the master clock E.

DETAILED DESCRIPTION OF THE INVENTION

Table of Contents

General Description
Dual Formats
Programmable Options
Data Link Configuration
Detailed Description
Control and Status Register
Rate and Mode Control Register
RB Register
TB Register
Interrupt Logic
Pin Control Logic
Clocks
Operation of Preferred Embodiment
Initialization and Reset
Transmit Operation
Receive Operation
Wake-Up Operation
Miscellaneous Operational States

GENERAL DESCRIPTION

Figure 1:
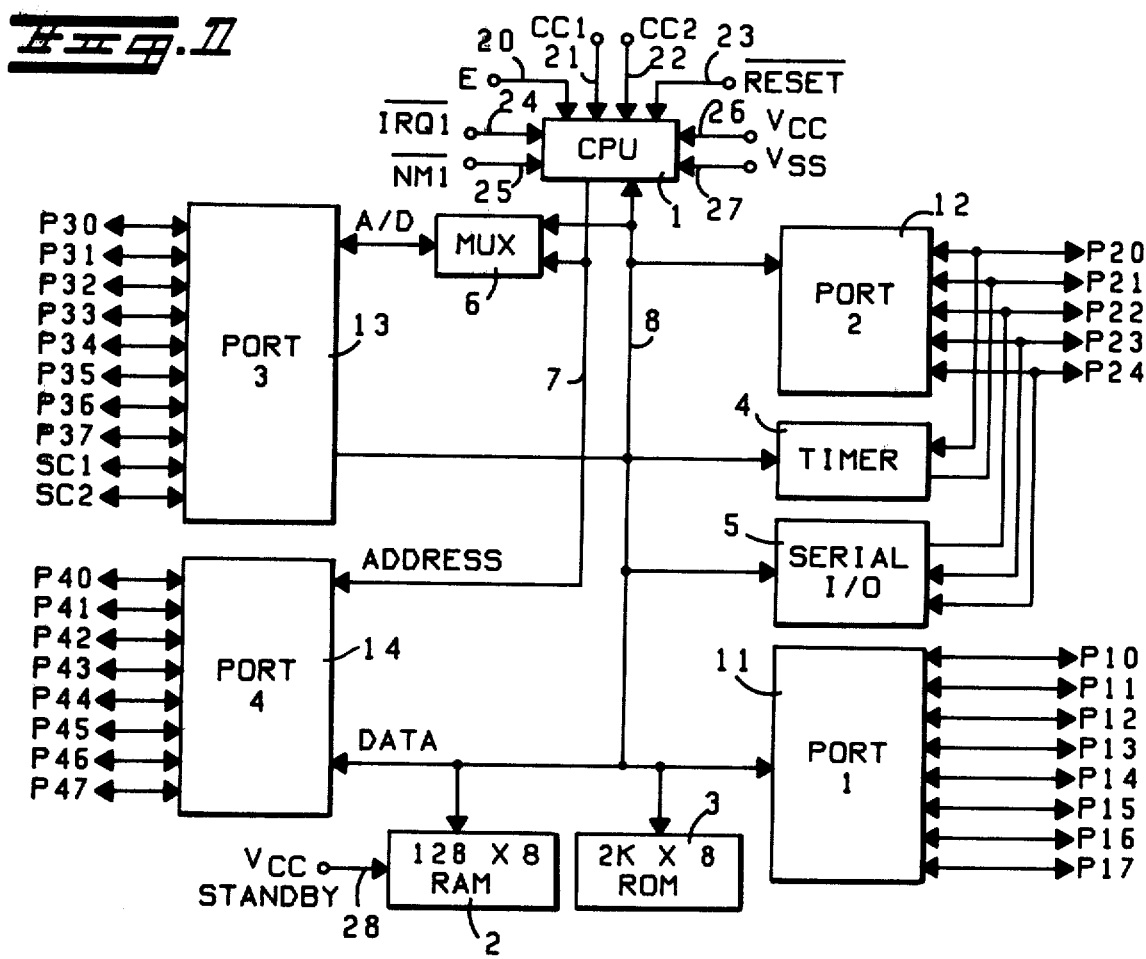
FIG. 1 shows a block diagram of a single-chip microcomputer which embodies the present invention.

With reference to FIG. 1, a block diagram of a single-chip microcomputer embodying the present invention is shown. It will be understood that the present invention may be implemented on other than a single-chip microcomputer. A preferred embodiment of the present invention is embodied in the microcomputer shown in FIG. 1, the Motorola MC6801 microcomputer.

The microcomputer shown in FIG. 1 comprises a central processor (CPU) 1, a random access memory (RAM) 2, a read-only-memory (ROM) 3, a timer circuit 4, and a serial I/O portion 5 as major functional blocks. The microcomputer shown in FIG. 1 also comprises a multiplexer (MUX) 6, an internal address bus 7, an internal data bus 8, and four I/O ports 11-14. CPU 1 receives as inputs thereto a master clock E over line 20, mode control signals CC1 and CC2 over lines 21 and 22, respectively, a RESET signal over line 23, an interrupt request signal (IRQ1) over line 24, a non-maskable interrupt signal (NMI) over line 25, a power supply signal (V$_{CC}$) over line 26, and a ground signal (V$_{SS}$) over line 27. The RAM 2 receives a V$_{CC}$ standby supply over line 28 to preserve data in the RAM in the event of a power failure.

Ports 1, 3, and 4 are 8-bit ports, and port 2 is a 5-bit port. The eight lines, P10-P17, into port 1 are dedicated solely to parallel I/O operations. The lines into ports 2-4 may be configured in different ways depending upon one of three possible modes of operating the microcomputer shown in FIG. 1. Port 2 has five lines P20-P24. Port 3 has eight lines P30-P37 and two control lines, SC1 and SC2. Control lines SC1 and SC2 into port 3 serve as input and output strobes. Port 4 has eight lines P40-P47. In the single chip mode all I/O lines of ports 2-4 can be programmed to serve either as inputs or outputs, in accordance with a data direction register associated with each port. In the expanded non-multiplex mode lines P30-P37 of port 3 function as the external data bus (D0-D7). In the expanded non-multiplex mode, lines P40-P47 of port 4 serve as the low-order address lines (A0-A7). If any of the eight address lines are not needed in this mode the remaining lines may be configured as I/O. In the expanded multiplex mode lines P30-P37 of port 3 serve both as the external data bus (D0-D7) and as the low-order address bus (A0-A7). In this mode, lines P40-P47 of port 4 serve as the high-order address lines (A8-A15). If any of the eight high-order address lines are not needed in this mode the remaining lines may be configured as I/O.

In all three modes lines P20-P24 of port 2 can be configured either as input or output lines by a data direction register associated with this port. Port 2 also provides access to the serial I/O communications capability and the programmable timer capability of the microcomputer shown in FIG. 1, in the manner to be discussed hereinafter.

The foregoing description of the microcomputer of FIG. 1, including the various operational modes, has been given as general background only, and the operation of the serial I/O features of the present invention may be completely understood independently of such description. The serial I/O operations of the present invention are conducted through pins P22, P23, and P24 only, and the function of these pins is unaffected by the particular mode of microcomputer operation as described above.

Figure 2:
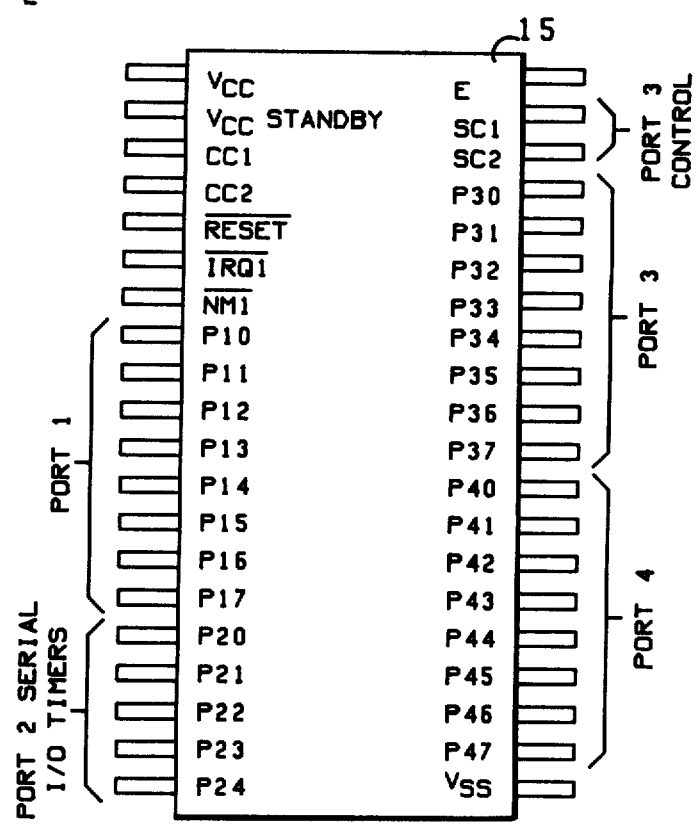
FIG. 2 illustrates the pin-out arrangement of the single-chip microcomputer which embodies the present invention.

FIG. 2 provides a schematic representation 15 of the pin-out arrangement of the microcomputer of FIG. 1.

DUAL FORMATS

Figure 7A:
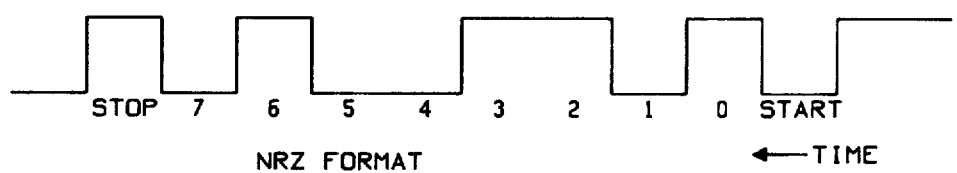
FIG. 7A illustrates NRZ-encoded data.
Figure 7B:
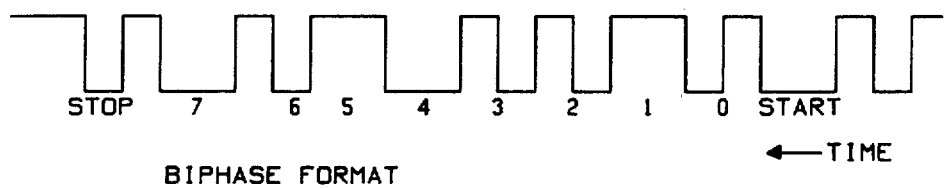
FIG. 7B illustrates biphase-encoded data.

The serial I/O portion of the microcomputer of FIG. 1 is capable of conducting serial communications in full duplex or half-duplex at a variety of clock rates. In addition, the serial I/O logic is capable of handling serial operations in either of two formats: (1) standard mark/space (NRZ) which is typically used between terminals or modems, and (2) self-clocking biphase which is primarily used for communications between processors. The NRZ format is illustrated in FIG. 7A, and the biphase format is illustrated in FIG. 7B. Both formats begin with a START bit (always 0) and end with a STOP bit (always 1). The NRZ format provides a signal level corresponding to the bit value at each bit time. The level is then sampled at the middle of the bit time on decoding. The example shown in FIG. 7A represents the NRZ-encoded binary number 01001101. It will be noted that the number is encoded beginning with the least significant bit (LSB). At bit time zero the signal level is high, representing a binary "1". At bit time "1", the signal level is low, representing a binary "0", and so forth until the STOP bit signal indicates the conclusion of one byte. The NRZ format can tolerate only approximately a 3.75% mismatch between the transmitter and receiver clocks for correct operation.

FIG. 7B illustrates the encoding of the binary number 01001101 in the biphase format. The biphase format provides a transition in signal level at every bit time and a transition at the center of every bit with the value 1. The biphase format, also known as biphase-M, FM, F/2F, and Manchester format, can tolerate a difference of approximately 25% between the transmitter and receiver clocks for correct operation. It should be noted that an idle line in NRZ format is represented by a constant mark (1) on the line. In biphase format, an idle line will be toggling at every half-bit time.

It is particularly advantageous to provide the capability of transmitting and receiving communications in biphase format on a microcomputer. Since the biphase format can tolerate a much greater clocking mismatch in processor-to-processor communications, it is particularly useful in multi-processor arrangements, such as occur, for example, in automotive environments.

Figure 3:
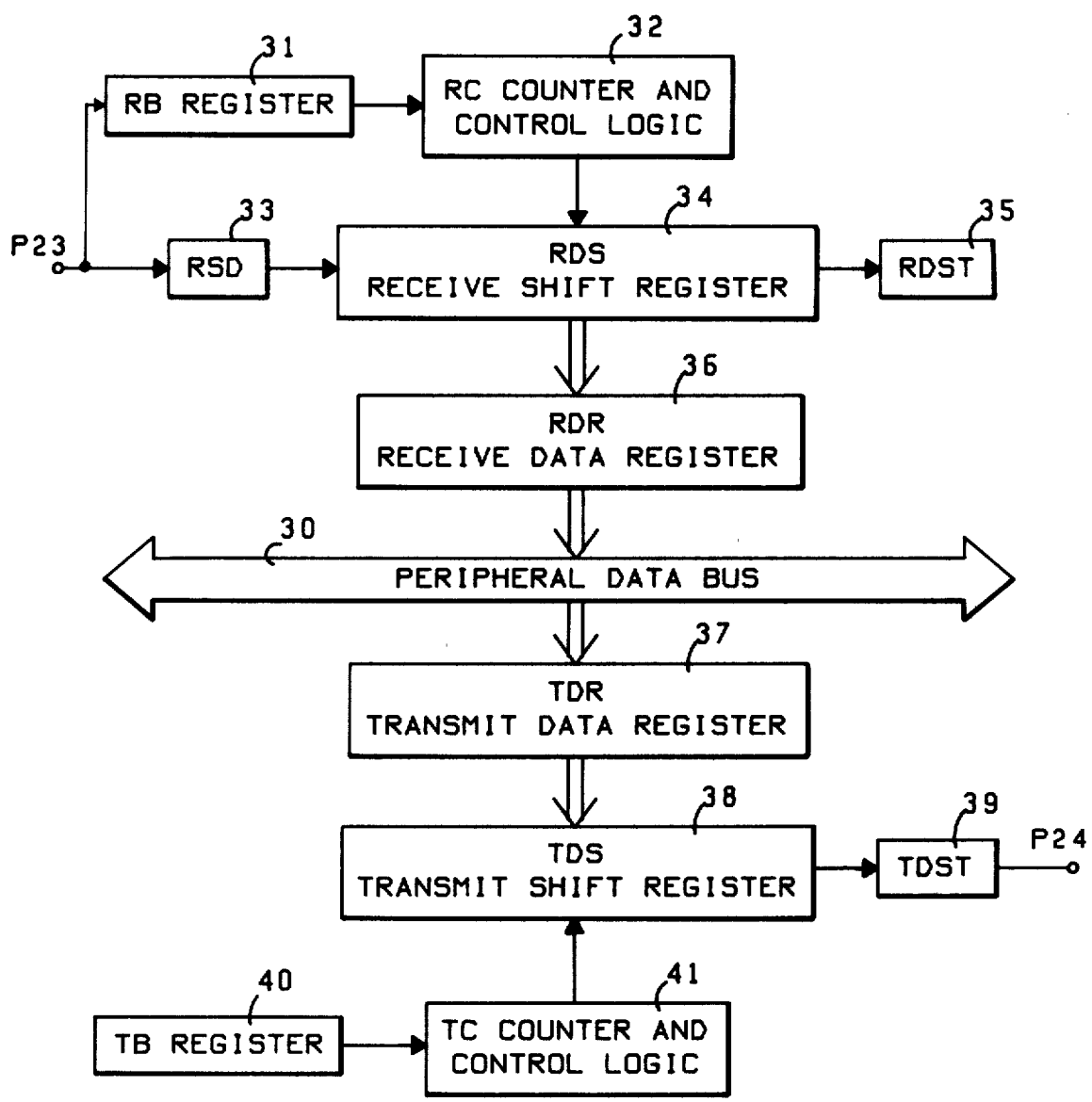
FIG. 3 shows a general block diagram of the serial I/O communication logic embodying the present invention.

With reference to FIG. 3, a general block diagram of the serial I/O communication logic embodying the present invention is shown. The serial I/O circuitry comprises a transmitter portion including Transmit Data Register (TDR) 37, Transmit Shift Register (TDS) 38, a flip-flop TDST 39, TB Register 40, and TC Counter And Control Logic 41. The serial I/O logic also includes a receiver section including flip-flop RSD 33, Receive Shift Register (RDS) 34, flip-flop RDST 35, RB Register 31, RC Counter And Control Logic 32, and Receive Data Register (RDR) 36. Both the transmitter and receiver sections communicate with the microcomputer via the Peripheral Data Bus 30 and with external devices via pins P22, P23, and P24 of port 2.

In data transmission, an 8-bit data word to be transmitted is written to the Transmitter Data Register TDR 37 from Peripheral Data Bus 30. The eight bits are then transferred in parallel from TDR 37 to the Transmit Shift Register TDS 38, which shifts the bits out to Pin 4 of Port 2 via flip-flop TDST 39. TDST 39 formats the data stream and adds the start and stop bits to each transmitted word.

In data reception, an in-coming data stream is input through Pin 3 of Port 2 and passes through flip-flop RDS 33 to the Receive Shift Register 34 where it is shifted until the start bit is in flip-flop RDST 35, the eight data bits are in the Receive Shift Register 34, and the stop bit is in flip-flop RSD 33. If no framing error or overrun condition exists, the eight data bits are transferred in parallel from the Receive Shift Register 34 to the Receive Data Register RDR 36. The word is then made available to the microcomputer by writing RDR 36 to Peripheral Data Bus 30.

PROGRAMMABLE OPTIONS

The serial I/O logic of the present invention is programmable with respect to several important features. The data communications format may be programmed to utilize either NRZ or biphase encoding. The clock may be programmed to utilize either internal or external clock signals. The baud rate is programmable to one of four per given internal or external clock frequency. The wake-up capability may be enabled or disabled. Interrupt requests may either be enabled or masked individually regarding the Transmit Data Register 37 and Receive Data Register 36. The clock output to pin 2 of port 2 may either be enabled or disabled. Finally, pins 3 and 4 of port 2 may either be dedicated or not dedicated to serial I/O operations individually with the transmitter and receiver portions.

Table I gives the four possible data communication rates for each of the microprocessor $\phi 2$ clock frequencies or the external clock frequencies. The various data rates and clock frequencies will be discussed in further detail within the Detailed Description.

DATA LINK CONFIGURATION

The data link used with the serial I/O logic of the present invention may be either half-duplex or full duplex and may either use a separate clock or not. Both biphase and NRZ formats may be used without a separate clock line, but only the NRZ format may be used with a separate clock line (either input or output). Also it is possible to transmit only a clock to a remote device. The various data link configurations are summarized in Table II.

The present invention provides a wake-up capability in multi-processor configurations utilizing the microcomputer shown in FIG. 1. The wake-up capability is intended to increase processor throughput by permitting non-interested processors on a common line to ignore the remainder of a message if the destination address is different from that of the particular processor. If the processor determines that the remainder of the message is not intended for it, it sets a wake-up bit (WU) in the Control and Status Register. With the wake-up bit set, the receiver portion continues to monitor messages without being interrupted. When ten consecutive "1's" are received by the receiver portion, the receiver portion clears the wake-up bit WU to "wake-up" the interrupt processing for the next message. The ten consecutive "1's" indicate the idle state on the transmission line. The wake-up capability will be described in greater detail below.

DETAILED DESCRIPTION

Figure 4:
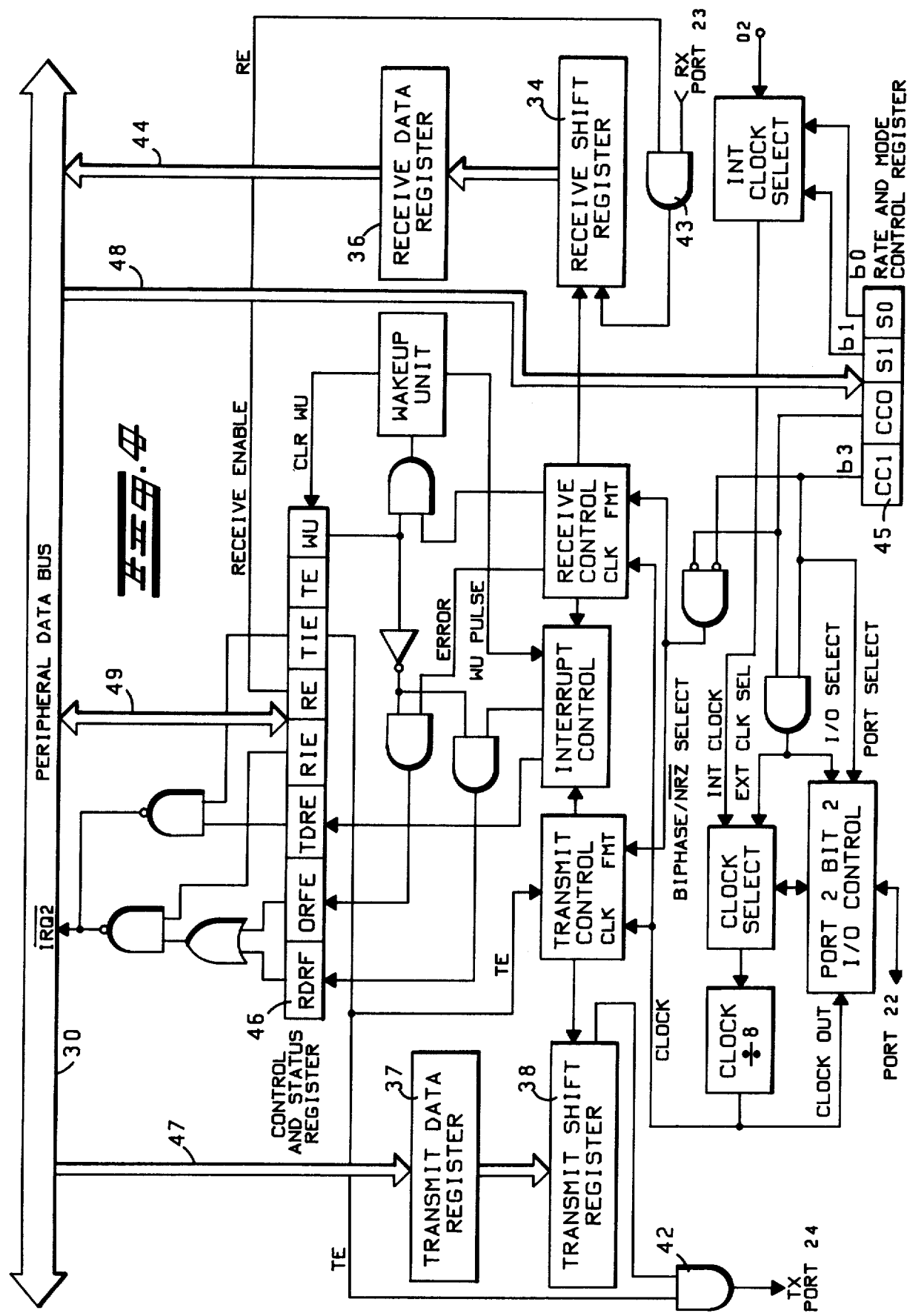
FIG. 4 shows a detailed block diagram of the serial I/O communication logic of the present invention.

With reference now to FIG. 4, a detailed block diagram of the serial I/O logic of the present invention is shown. Data may be taken off Peripheral Data Bus 30 via an 8-bit bus 47 to Transmit Data Register 37, from which it is entered into Transmit Shift Register 38. From Transmit Shift Register 38 the data is shifted out serially through a gate 42 enabled by the Transmit Enable (TE) pulse. Pin 4 of port 2 is the serial transmit line.

Serial data is received over pin 3 of port 2 through gate 43 enabled by Receive Enable (RE) signal. The serial input data is shifted into Receive Shift Register 34, and is then transferred in parallel into Receive Data Register 36. The contents of Receive Data Register 36 is sent over 8-bit bus 44 to the Peripheral Data Bus 30, from which it may be utilized by other portions of the microcomputer.

Figure 5:
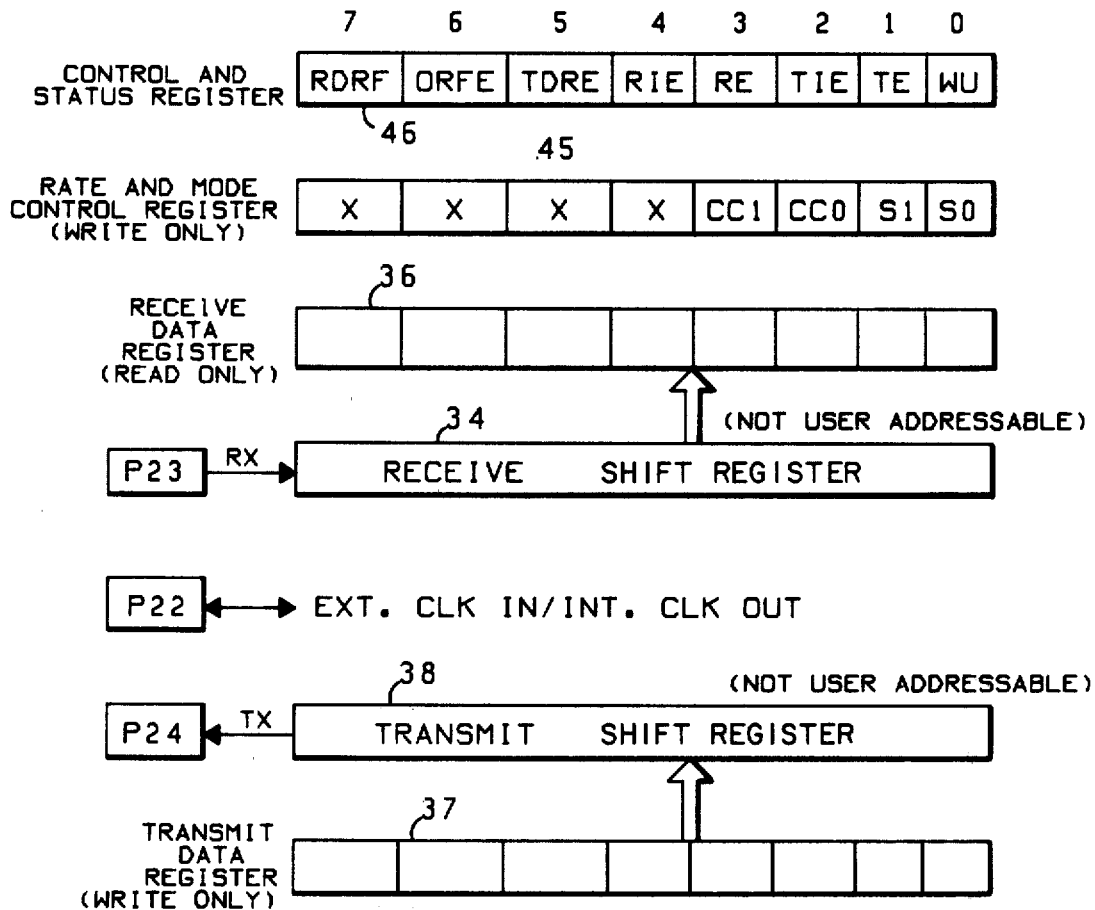
FIG. 5 illustrates the software-addressable registers of the serial I/O communication logic.

The serial I/O logic of the present invention utilizes four software-addressable registers, which are shown in FIG. 5 in the form of Control And Status Register 46, Rate and Mode Control Register 45, Receive Data Register 36, and Transmit Data Register 37.

Control and Status Register 46 consists of an 8-bit register of which all 8 bits may be read while only bits 0-4 may be written. The register is initialized to $20 (i.e. $20_{16} = 00100000$) on $\overline{\text{RESET}}$. The bits in the register are defined as follows:

| 7 | 6 | 5 | 4 | 3 | 2 | 1 | 0 | |
|---|---|---|---|---|---|---|---|---|
| RDRF | ORFE | TDRE | RIE | RE | TIE | TE | WU | ADDR: $0011 |

Bit 0 WU — "Wake-up" on next message. When set, this bit enables the wake-up function; it is cleared by hardware on receipt of ten consecutive 1's. WU will not set if the line is idle.

Bit 1 TE — Transmit Enable. When set, this bit produces a preamble of nine consecutive 1's and enables gating of the transmitter output to port 2, pin 4; it changes the DDR value for port 2, pin 4 to a "1".

Bit 2 TIE — Transmit Interrupt Enable. When set, it permits an $\overline{IRQ2}$ interrupt to occur if TDRE is set. When clear, the TDRE value is masked from the bus.

Bit 3 RE — Receiver Enable. When set, it gates port 2, pin 3 to the input of the receiver. It changes the DDR value for port 2, pin 3 to a zero.

Bit 4 RIE — Receiver Interrupt Enable. When set, it permits an $\overline{IRQ2}$ interrupt to occur when either RDRF or ORFE is set. When clear, the interrupt is masked.

Bit 5 TDRE — Transmit Data Register Empty. It is set by hardware when a transfer is made from the Transmit Data Register to the Transmit Shift Register. This transfer is synchronized with the bit rate clock. The TDRE bit is cleared by reading the Status Register, then writing a new byte into the Transmit Data Register. No data will be transmitted if TDRE is not cleared. TDRE is initialized to 1 by $\overline{RESET}$.

Bit 6 ORFE — Over-Run-Framing Error. It is set by hardware when an overrun or framing error occurs (receiver only). An overrun is defined as a new byte transferred to the Receive Data Register with the RDRF flag set. A framing error has occurred when the byte boundaries in the bit stream are not synchronized to the bit counter. An overrun may be distinguished from a framing error by the corresponding value of RDRF. If RDRF=ORFE=1, then an overrun has occurred. If RDRF=0 and ORFE=1, a framing error has been detected. The ORFE bit is cleared by first reading the Status Register, then reading the Receive Data Register, or by a $\overline{RESET}$ signal.

Bit 7 RDRF — Receive Data Register Full. It is set by hardware when a transfer from the Receive Shift Register to the Receive Data Register is made. The RDRF bit is cleared by first reading the Status Register, then reading the Receive Data Register, or by a $\overline{RESET}$ signal.

Rate and Mode Control Register 45 controls the following serial I/O variables: baud rate, format, clocking source, and Port 2 Pin 2 configuration.

The register consists of four bits all of which are write-only and are cleared on $\overline{RESET}$. The four bits in the register may be considered as a pair of 2-bit fields. The two low-order bits control the bit rate for internal clocking, and the remaining two bits control the format and clock select logic. The register definition is as follows:

| 7 | 6 | 5 | 4 | 3 | 2 | 1 | 0 | |
|---|---|---|---|---|---|---|---|---|
| X | X | X | X | CC1 | CC0 | S1 | S0 | ADDR: $0010 |

Bit 0, Bit 1 } S1, S0 — Speed Select. These bits select the baud rate for the internal clock. The four rates which may be selected are a function of the CPU $\phi2$ clock frequency.

The following table lists the available baud rates. If external clocking is selected (CC1=CC$\phi$=1), the speed select bits are ignored.

TABLE 1

| S1,S0 | XTAL<br>$\phi2 =$ | 4.0 MHZ<br>1.0 | 4.9152 MHZ<br>1.2288 | 2.5476 MHZ<br>0.6144 |
|---|---|---|---|---|
| 00 | 16 | 62.5 KBaud | 76.8 KBaud | 38.4 KBaud |
| 01 | 128 | 7,812.5 Baud | 9,600 Baud | 4,800 Baud |
| 10 | 1024 | 976.6 Baud | 1,200 Baud | 600 Baud |
| 11 | 4096 | 244.1 Baud | 300 Baud | 150 Baud |

Bit 2, Bit 3 } CC1, CC0 — Clock Control and Format Select. This 2-bit field controls the clock and format select logic.

The following table defines the bit field. If CCl=0, the DDR value for port 2 pin 2 is not affected. If CC1=1, the DDR value for port 2 pin 2 is changed to the complement of CCφ.

and RSE is set by the leading edge of RLG at ¾ bit time. RSH and RLG represent the outputs of inverters RSH and RLG, respectively, in the lower portion of FIG. 8J. The separation flip-flop RSD is driven by RSH and

| CC1, CC0 | FORMAT | CLOCK SOURCE | PORT 2 BIT 2 | BIT 3** | BIT 4** |
|---|---|---|---|---|---|
| 00 | BI-PHASE | INTERNAL | NOT USED | SERIAL INPUT | SERIAL OUTPUT |
| 01 | NRZ | INTERNAL | NOT USED | SERIAL INPUT | SERIAL OUTPUT |
| 10 | NRZ | INTERNAL | OUTPUT* | SERIAL INPUT | SERIAL OUTPUT |
| 11 | NRZ | EXTERNAL | INPUT | SERIAL INPUT | SERIAL OUTPUT |

*Clock output is available regardless of values for bits RE and TE.
**Bit 3 is used for serial input if RE = "1" in Control and Status Register 46. Bit 4 is used for serial output if TE = "1" in Control and Status Register 46.

RB REGISTER

Figure 8A:
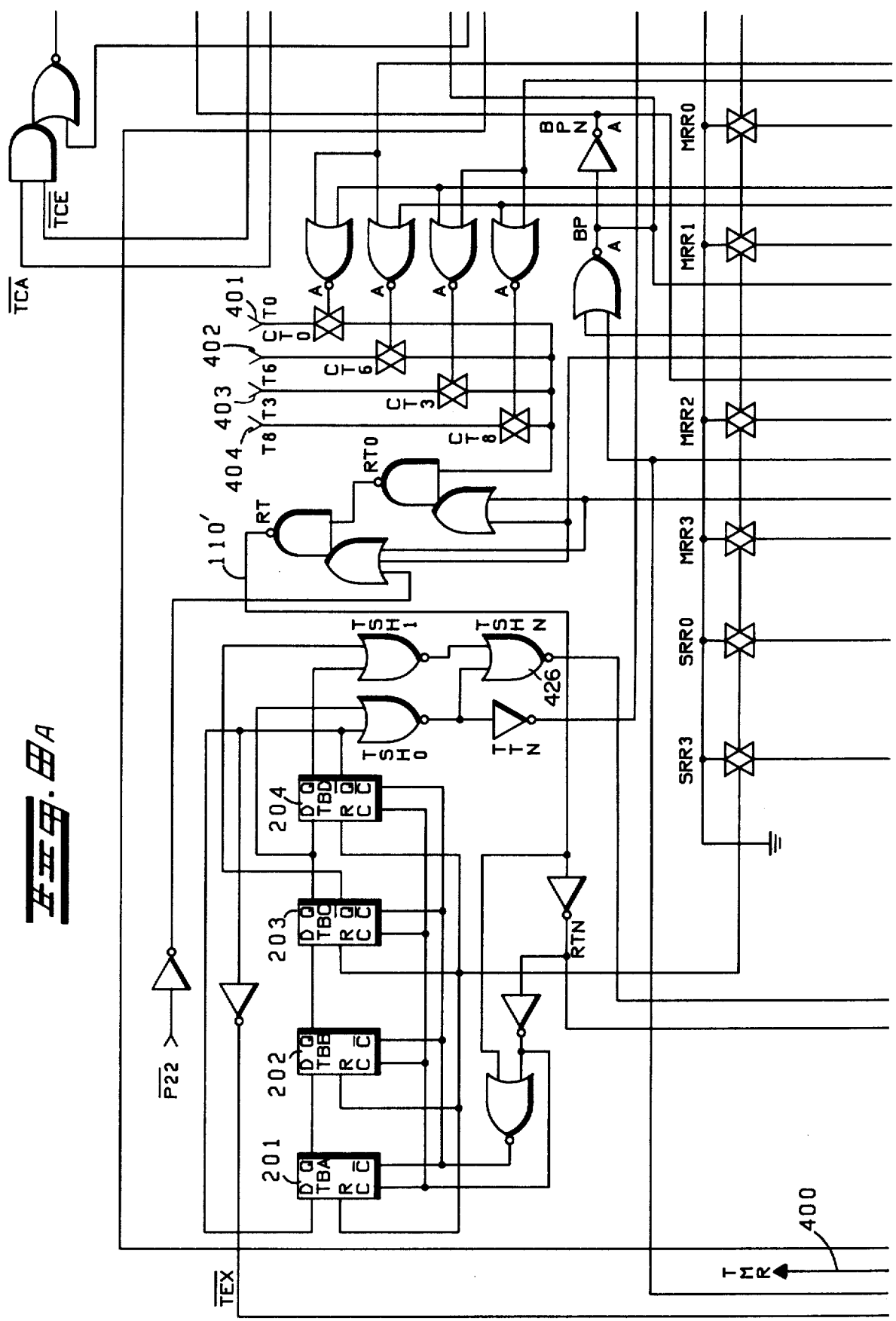

RB Register 31 is an 8-bit delay line which is used to extract the imbedded clock from the input data stream and to establish receiver synchronization. Reference to the appropriate Boolean equations below and the detailed logic diagram of FIGS. 8A–8J shows that in the NRZ format the zero start bit is clocked into RB Register 31 in FIG. 3 (291–298, FIG. 8J) and that thereafter the input toggles at the bit rate so long as RE remains set. Approximately two RT clock cycles are required (setting RE turns on the RB input) before RB Register 31 can respond to a "zero" start bit. The RT clock is generated by NAND gate RT over line 110 (FIG. 8A). As the "zero" propagates along, RB synchronization is established when RSE (102, FIG. 8I) sets at the end of the third RT clock. The first RSD clock (RBD⊕RBE) is also generated at the end of the third RT clock, and the first R⊖ clock is generated at the end of the fifth RT clock. The RSD clock is generated by RSD logic 111 (FIG. 8J), and the R⊖ clock is generated by inverter R⊖ at the bottom portion of FIG. 8J. The RSD$_C$ and R⊖ clocks continue to be generated at ⅜ bit time and ⅝ bit time so long as RB register 31 operates.

The bit counter RC (281–285, FIG. 8I) goes to "one" at the end of R⊖ and increments on each succeeding R⊖. The start bit is clocked into RSD by RBD+RBE. There is a normal loss of synchronization after data transfer, with synchronization regained during the following start bit.

The effect of resetting RE is that RB stops toggling; there is a loss of synchronization, R⊖, and RBD+RBE signals; the bit counter RE resets; and RSD, the RDS shift register 34, and RDST all stop. In the biphase format the entire data stream is clocked into the register.

After the microcomputer of FIG. 1 comes out of reset and before RE is set the RB Register begins filling up with "ones", and hence no bit-rate clocks are generated, and the receiver is not functioning. There are three things necessary to establish reception: (a) RE must be set in order for the serial input data to be input to the RB Register, (b) the serial input data must be the idle line condition, namely all "ones", in order for the RB Register to begin generating the bit rate clocks, and (c) the first start bit in the serial input data stream cannot occur until the line has been idle for at least 1 bit time (otherwise synchronization cannot be established). Therefore, the minimum time the line must remain idle after RE is set is one bit time.

Following the setting of RE, synchronization is established when RSE is set, which occurs when the first "zero" propagates along the RB Register, the first R⊖ is generated by the leading edge of RSH at ¼ bit time, RLG and generates a signal SEP which is zero for "zero" input data and 5 volts for ½ bit time if data input is "one". The timing of SEP (FIG. 8J) is such that as it is clocked into the Receive Shift Register 34 by R⊖ it is finally totally converted to the NRZ format.

Setting RSE starts the bit counter RC. Since RSE sets ¼ bit time later and R⊖ occurs ⅛ bit time later for biphase than for NRZ, the location of each bit counter state for the biphase format lags the corresponding bit counter state for the NRZ format by 1⅛ bit times. Thus the data transfer from the Receive Shift Register RDS 34 to the Receive Data Register RDR 36 which occurs at the end of the RC 9-count in both formats, occurs 1⅛ bit times later in biphase than in NRZ, i.e. near the end of the stop bit for NRZ and near the end of the following start bit for biphase.

The effect of resetting RE is to cause RB Register 31 to stop toggling (causing loss of synchronization and bit clock R⊖), the resetting of bit counter RC, and stopping of RDS 34 together with RSD and RDST. In biphase reception all internal functions are clocked by signals derived from the incoming data stream. Consequently, as long as RSH and RLG are both generated the separation flip-flop SEP 101 (FIG. 8J) will operate properly and generate R⊖.

Biphase synchronization is established when RSE sets on the first start-bit following at least one idle bit. Eleven idle bits will reset RSE, but synchronization is not lost so long as data words are separated by no more than ten idle bits.

In NRZ reception internal operation is initiated by the start bit and terminated by the stop bit of each data word. All operations in between are clocked at the independent internal clock rate. Operation begins when RSE 102 sets at the middle of the "zero" start bit following an idle condition of at least two bit times. RSE 102 then resets immediately following data transfer from the RDS register 34 to the Receiver Data Register 36.

For the case of a data rate faster than R⊖, the start bit is clocked into RB Register 31 which then toggles for the next eight bit times thus generating R⊖ at the internal clock rate of the serial I/O controller. When the data rate is faster than R⊖ the stop bit and the following start bit are successfully clocked into RB Register 31 earlier than nominal. The corresponding periods of the R⊖ and RBD ⊕ RBE clocks are consequently shortened by one or two RT times. At this highest data rate (for proper operation) RSE resets and data transfers one RT time sooner and synchronization during the following start bit is established 2 RT times sooner.

For the case of a data rate slower than R⊖, operation for the start bit and first seven data bits is identical to operation at high data rates. Operation during the eighth data bit and stop bit differs according to whether the last data bit is a "zero" or a "one".

If the last data bit is "zero", the generation of R⊖, the resetting of RSE, and the transfer of data are all delayed until the middle of the stop bit. The following start bit then re-initiates the sequence of operations necessary to receive one data word.

If the last data bit is "one", the generation of R⊖, the resetting of RSE, and the data transfer all occur at their nominal positions and nothing happens during the stop bit. The following start bit then re-initiates the receive cycle. Thus for slow data a "one" in the last data bit position acts similar to a stop bit, and everything holds during the actual stop bit until the start bit re-initiates the cycle.

TB REGISTER

TB Register 40 in FIG. 3 (201-204, FIG. 8A) is a four-bit counter that counts continuously from 1 to 8 at the RT rate beginning at the end of RESET. The external clock TEX is the 50% duty cycle waveform available at TBD and hence is in phase with the transmitted data stream. TSH is a 2× occurring at the end of each bit. The only difference between the biphase and NRZ formats is in the operation of the formatting flip-flop TDST (112, FIG. 8J).

With regard to transmitter operation note that the idle line condition is established after the setting of TE and that data transfer occurs at the middle of the start bit. When TDE is not serviced before the middle of the stop bit it remains set and cuases the TC counter to hold at the 9-count, thus inhibiting the data transfer. When TDE is reset, transmission resumes with the next start bit.

TSH·$\overline{T\ominus}$ clocks in data from TSHφ to TDST at each bit boundary for either format, and, during biphase only, TSH·T⊖ clocks in a toggle for TDSφ=1, or if the line is idle, or during each stop bit.

In either the biphase or the NRZ format the transmitter works in the NRZ format except for the formatting flip-flop, TDST, which is essentially the transmitter output stage. TDST is clocked by RSH (which occurs at twice the R⊖ rate) and every other RSH coincides with R⊖.

The transmitter outputs ones as long as TSE is not set. TSE sets when the TC counter reaches the 10-count and remains set as long as TE=1. Accordingly, a preamble of ten ones is transmitted when TE is first turned on. At any time after the initial preamble of ten ones if a word has not been written into the Transmit Data Register 37, the TC counter holds at the 9-count, and TDST continually outputs ones.

INTERRUPT LOGIC

The serial I/O controller communicates with the CPU via the IRQ2 interrupts. If receiver interrupts have been enabled by RIE and by resetting WU, an IRQ2 interrupt is generated whenever an overflow or a framing error sets the OR bit or whenever transfer of a valid word from the Receive Shift Register 34 to the Receiver Data Register 36 sets the RDF bit. If transmitter interrupts have been enabled by setting TIE, an IRQ2 interrupt is generated whenever data transfer from the Transmitter Data Register 37 to the Transmit Shift Register 38 sets the TDE bit.

Use of the WU, the "wake-up" bit, is determined by the data link protocol. If after examination of the first part of a message the CPU ascertains that it has no further interest in the remainder of the message and sets WU, all further interrupts are inhibited until the line goes idle. The WU bit is reset by hardware whenever ten contiguous "ones" are received, or it can be reset by software.

Each of the three interrupt bits RDF, OR, and TDE has a follower bit that sets whenever the Control and Status Register 46 is read while its associated bit is also set. The RDF and OR interrupt bits and their followers are reset whenever the Receive Data Register 36 is read while its associated follower bit is also set. The TDE interrupt bit and its follower are reset whenever the Transmit Data Register 37 is written while its follower is set.

PIN CONTROL LOGIC

Regarding the control of port 2, at the end of RESET the serial I/O controller overrides CPU control of from one to three pins of port 2 depending upon the operating mode defined by control bits RE, TE, CC1, and CCφ. RE and TE determine the duplex configuration while CC1 and CCφ determine the external clock configuration.

Pin 2 of port 2 may be used either to input an externally generated clock or to output a clock generated by the I/O controller. When CC1="0" this pin is controlled by the CPU but when the CC1="1" this pin is used to either input an external clock or output an internal clock.

When CC1="0" the I/O controller does not use pin 2 and accordingly the CC1·DDR2 coupler allows the CPU control signal WP2·DDR2 to determine the state of the pin 2 data direction latch comprising transmission gates 86 and 87, inverter 88, and NOR gates 85 and 89. When CC1="1" the CCφ control bit determines the state of the data direction latch.

The pin data output register comprising NOR gates 90 and 91, inverters 92-94 and transmission gate handles CPU data when CC1="0", and outputs $\overline{TEX}$, the internally generated clock, when CC1·CCφ="1". When CC1·CCφ="1" pin 2 inputs an externally generated clock and the data output register is in a "don't care" state since the output driver is in a very high impedance.

The data input buffer 96 inputs the external signal on pin 2 under all operating conditions. However, it is only passed by the mode control logic when it is actually an external clock, i.e., when CC1·CCφ="1".

Pin 3 of port 2 is used to input serial data when the I/O controller is in the full-duplex or half-duplex receive modes. As long as the control bit RE="1" the pin 3 data direction latch DDR23 comprising NOR gate 98, inverters 99 and 106, and transmission gates 97 and 100 holds the output driver in the tri-state mode. The CPU controls DDR23 when RE="0". The data input buffer 104 inputs the external signal at pin 3 under all conditions.

Pin 4 of port 2 is used to output serial data when the I/O controller is in the full-duplex or the half-duplex transmit modes. As long as TE="1" the pin 4 data direction latch comprising inverter 107, NOR gates 108 and transmission gate 105 is held in the output state and the serial data, $\overline{TDST}$, is input to the pin 4 data output register comprising NOR gate 110, inverters 113 and 114, and transmission gates 111, 112 and 115. The CPU is in control when TE="0".

CLOCKS

Figure 12:
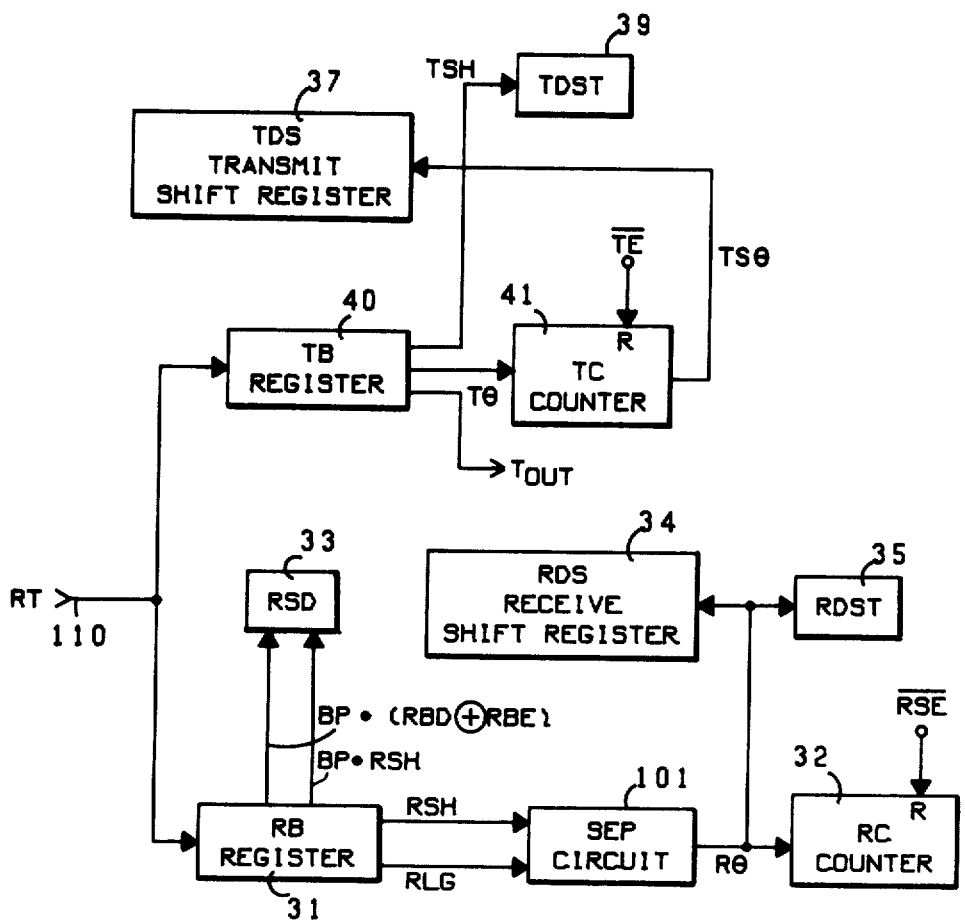
FIG. 12 is a block diagram illustrating the clocking arrangement in a preferred embodiment of the present invention.

The overall clocking management is depicted in FIG. 12. The four bits in the Rate And Mode Control Register 45 (FIG. 4 and 5) determine the source and frequency of the high-speed clock RT (generated over line 110 in FIG. 8A). RT is a 50% duty cycle clock at exactly 8 times the transmitted data rate and approximately 8 times the received data rate. The transmitter and receiver clocks are derived from RT.

The transmitter clocks are:

TSH: a pulse train at 2 times the data rate which is used to clock the formatting flip-flop TDST. TSH is generated by NOR gate TSHN in FIG. 8A.

T⊖: the bit rate clock which drives the bit counter TC. T⊖ is generated by NOR gate TSHO in FIG. 8A.

TS⊖: the Transmit Shift Register clock which is the same as T⊖ with every 10th pulse missing. TS⊖ is generated by NOR gate TSO in FIG. 8F.

TEX(Tout): a 50% duty cycle clock at the data bit rate which is available for transmission to remote devices. TEX is generated by flip-flop TBD in FIG. 8A.

The receiver clocks are:

RSH: two pulses which are generated for every biphase "one" in the received data stream. This clock does not exist in the NRZ format. RSH is generated by inverter RSH in FIG. 8J.

RLG: one pulse which is generated for every biphase "zero" in the received data stream. In the NRZ format RLG is identical to R⊖. RLG is generated by inverter RLG in FIG. 8J.

R⊖: an embedded clock which is extracted from the received data stream and drives RC counter 32, Receive Shift Register 34, and the start-bit flip-flop RDST 35. R⊖ is generated by inverter R⊖ in FIG. 8J.

RBD ⊕ RBE: The clock, at the same rate as R⊖ but nearer mid-bit, which drives the separation (or deformatting) flip-flop RSD 33. RBD and RBE are generated by flip-flops RBD and RBE, respectively, in FIG. 8J.

Of the five high-speed clocks provided, four are tapped off of the microcomputer timer 4 and the fifth can be input from an external source. All of the high-speed clocks have a 50% duty cycle and are at 8 times the data rate. The four timer clocks are designated Tφ, T3, T6, and T8 and correspond to φ2 (the CPU clock) divided by 2, 16, 128, and 512 respectively.

FIGS. 8A–8J constitute individual section of a preferred embodiment of the serial I/O logic of the present invention. The individual figures may be fitted together in the manner shown by FIG. 9 to form the complete serial I/O logic schematic of the FIG. 1 single-chip microcomputer. Given the logic schematic of FIGS. 8A–8J, one of ordinarly skill in the art is enabled to implement the seial I/O logic of the present invention by using existing circuit technology, such as MOSFET (Metal Oxide Semiconductor Field Effect Transistor) technology. A detailed recitation of the interconnections between the logic and circuit elements shown in FIGS. 8A–8J would only encumber the description. However, various of the structures shown and described with regard to the general block diagram of FIG. 3 will be highlighted in the detailed logic schematic of FIGS. 8A–8J.

FIG. 8A shows the 4-bit TB Register comprising flip-flops 201–204.

FIG. 8B shows the TC Counter And Control Logic comprising flip-flops 211–215.

FIG. 8C and 8D show the Rate And Mode Control Register comprising flip-flops 221–224. Also shown in FIGS. 8C and 8D is the Control And Status Register comprising flip-flops 231–238.

FIG. 8E shows the Receive Data Register comprising flip-flops 241–248 and the Receive Shift Register comprising flip-flops 251–258.

FIG. 8F shows the Transmit Data Register comprising flip-flops 261–268 and the Transmit Shift Register comprising flip-flops 271–278.

FIG. 8G shows the bonding pad 320 for I/O pin 2 of port 2, as well as $V_{DD}$ pad 303, and $V_{SS}$ pad 304. The $V_{DD}$ and $V_{SS}$ signals will be understood to be distributed throughout the logic shown on FIGS. 8A–8J as required.

Figure 8H:
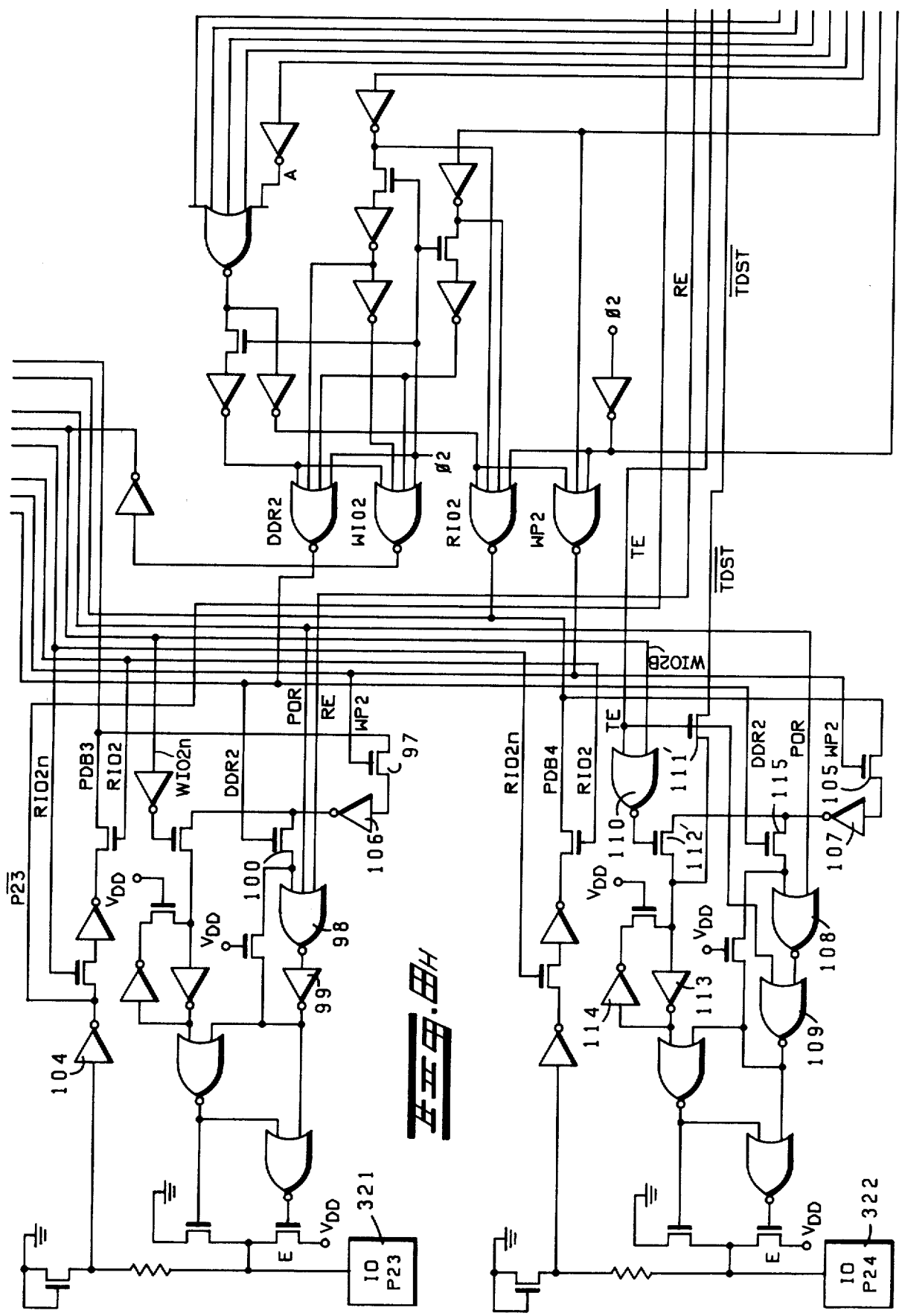

FIG. 8H shows the bonding pad 321 for I/O pin 3 of port 2 and bonding pad 322 for I/O pin 4 of port 2.

FIG. 8I shows RC Counter And Control Logic comprising flip-flops 281–285 and shows in addition the RSE flip-flop 102.

FIG. 8J shows the RB Register comprising flip-flops 291–298. FIG. 8J also shows the SEP flip-flop 101, the RSD flip-flop 111, and the TDST flip-flop 112.

FIG. 10 shows the RESET bonding pad 323 and associated circuitry for generating the RESET signal over line 300, the MODL signal over line 301 and the VRBIAS signal over line 302. It will be noted that the RESET signal is sometimes designated as the POR signal in the logic diagram of FIGS. 8A–8J.

The lines of FIGS. 8A–8J which connect other portions of the microcomputer (not shown) will now be discussed. In FIG. 8A a TMR signal is transmitted over line 400 and signals Tφ, T6, T3, and T8 are transmitted over lines 401–404, respectively, to the microcomputer programmable timer 4 (FIG. 1) for purposes not associated with the object of the present invention. In FIG. 8D an interrupt control signal IRQS is transmitted over line 410 to the programmable timer. In FIG. 8F the individual lines of the Peripheral Data Bus 30, which bus transmits data to and from the serial I/O logic, are identified as PDB0–PDB7. In FIG. 8I signal PC2, which is transmitted over line 415, represents one of three program control bits in port 2, which program control bits are used to program the mode of operation of the microcomputer in a manner unassociated with the objects of the present invention. Also shown in FIG. 8I is a signal IRSB on line 416, which signal is merely a control signal generated by the CPU. Further shown in FIG 8I are some of the internal microcomputer address lines identified as A1–A4 and the Read/Write control line identified as R/W.

FIG. 11 illustrates schematically a clock generator 420 for generating clock signals φ1 and φ2 used for internal microcomputer operations. Signals φ1 and φ2 are generated from master clock E and the relationship between clocks E, φ1, and φ2 is shown by FIG. 13.

OPERATION OF PREFERRED EMBODIMENT

Initiatization and Reset

The serial I/O controller should be initialized by the microcomputer ROM software prior to operation. This sequence will normally consist of (1) writing the desired operation control bits to the Rate And Mode Control Register 45 and (2) writing the desired operational control bits in the Control And Status Register 46. The Transmitter Enable (TE) and Receiver Enable (RE) bits may be left set for dedicated operations.

Figure 14:
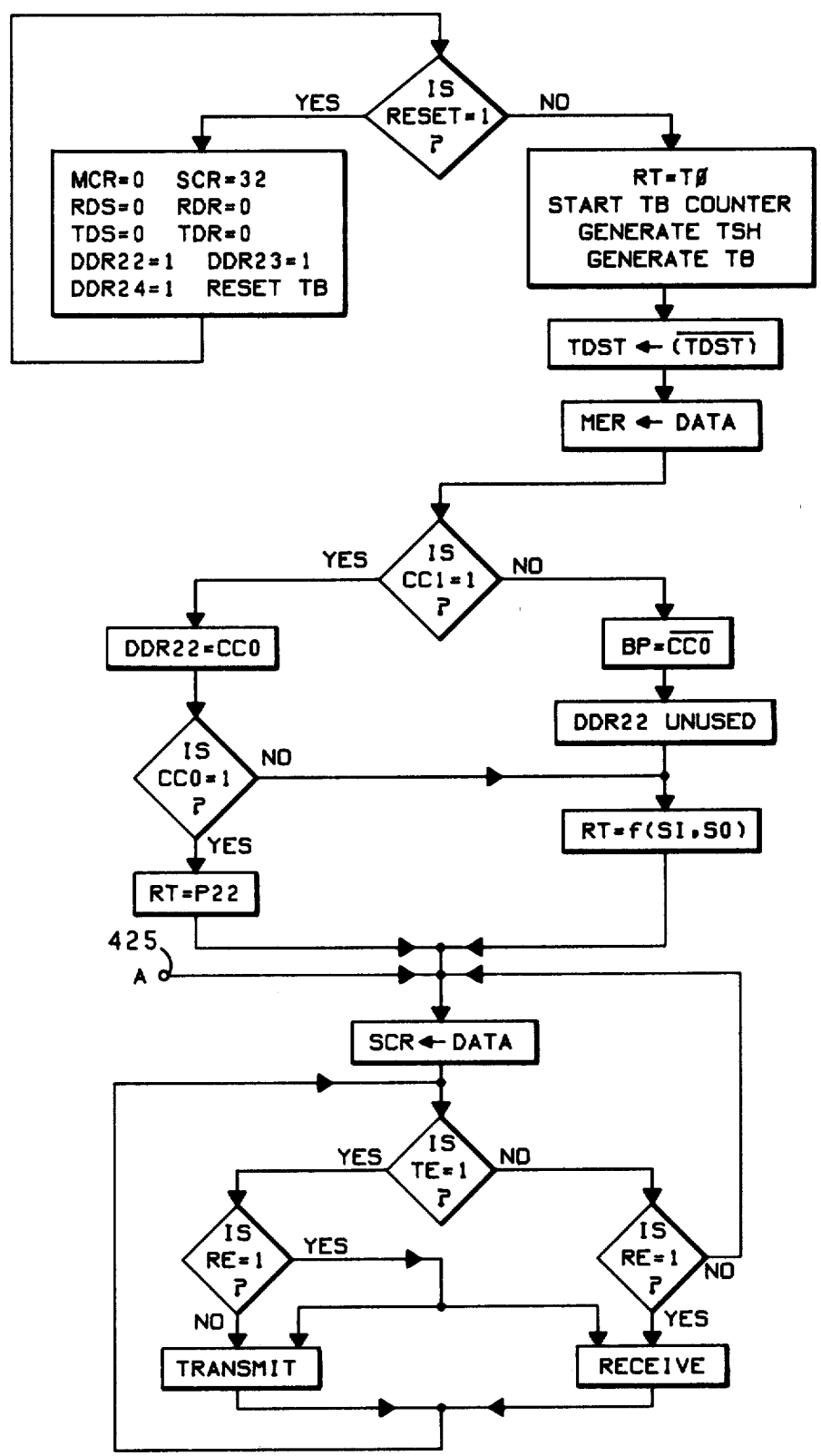
FIG. 14 represents a flowchart of the reset operation of the serial I/O communication logic.

Reference may be made to FIG. 14 for a flow chart of the reset operation. During reset the Transmit Data Register 37, the Receive Data Register 36, and all of the status and control bits in both the Rate and Mode Control Register 45 and the Control and Status Register 46 are reset with the exception of control bit TDE which is set to indicate that the Transmit Data Register 37 is empty. In addition, the TB Register 40 is reset, the RB Register 31 is stopped (not reset), and the serial I/O pins of port 2 (P22, P23, and P24) are configured as input. Although an external clock may be available from P22 the RB Register 31 is stopped because no clock is available from the Timer 4 during this time.

In addition to the possible external clock four more clock speeds (submultiples of $\phi 2$) become available from Timer 4 at the end of reset. Since MCR=0, the highest-speed clock T$\ominus$ (=2÷2) is selected by the mode logic as the high-speed clock RT. RT clocks both the RB and TB Registers which run continuously during RESET. The input to the RB Register is held at "one" until RE is set, while TB counts continuously.

TSH and T$\ominus$ are derived logically from the TB Register and are used to clock the formatting flip-flop TDST 112 (FIG. 8J) and the transmitter bit counter TC (TCA through TCD in FIG. 8B), respectively. Every tenth T$\ominus$ clock is suppressed by the transmitter bit counter logic to generate TS$\ominus$, the Transmit Shift Register clock.

It is thus seen that at the end of reset the serial I/O controller is functioning in a degenerate mode with the transmitter bit counter running at the highest speed. The formatting flip-flop TDST 112 is toggling in the biphase format, with the port 2 pins not properly configured. The receiver RB Register is also being clocked at the highest speed but fills up with "ones" and hence cannot generate the clock for the de-formatting flip-flop RSD 111 (FIG. 8J) which remains in an arbitiary state.

Non-trivial operation begins with the writing of four control bits into the Rate and Mode Control Register 45. These bits (CC1, CC$\phi$, S1, S$\phi$) select the desired clock source and speed, determine the data format, and configure the clock pin (P22) as required. Next, five control bits are written into the Control and Status Register to complete the mode specification. Two of these bits (TIE and RIE) determine whether or not interrupts are masked. Two other bits (RE and TE) determine whether operation is half-duplex (either transmitting or receiving) or full duplex. The fifth bit (WU) is used for the wake-up mode which will be explained under Receive Operation.

TRANSMIT OPERATION

The transmit operation is enabled by the TE bit in the Control and Status Register 46. This bit, when set, gates the output of the serial Transmit Shift Register 38 to port 2 pin 4 and takes precedence over the Data Direction Register value for port 2.

Following a $\overline{\text{RESET}}$, both the Rate and Mode Control Register 45 and the Control and Status Register 46 should be configured for desired operation. Setting the TE bit during such procedure initiates the serial output by first transmitting a nine-bit preamble string of 1's. Following the preamble, internal synchronization is established and the transmitter section is ready for operation.

At this point one of two situations exist: (1) if the Transmit Data Register 37 is empty (TDRE=1), a continuous string of ones will be sent indicating an idle line, or (2) if data has been loaded into the Transmit Data Register 37 (TDRE=0), the word is transferred to the Transmit Shift Register 38 and transmission of the data word will begin.

During the transfer itself, the 0 start bit is first transmitted. Then the 8 data bits (beginning with bit 0) followed by the stop bit are transmitted. When the Transmit Data Register 37 has been emptied, the hardware sets the TDRE flag bit.

If the microcomputer CPU 1 fails to respond to the flag within the proper time (TDRE is still set when the next normal transfer from the Transmit Data Register 37 to the Transmit Shift Register should occur), then a 1 will be sent (instead of a 0) at the "Start" bit time, followed by more 1's until more data is supplied to the Transmit Data Register 37. No 0's will be sent while TDRE remains a 1.

The biphase mode operates as described above except that the serial output toggles each bit time, and also on ½ bit times when a 1 is sent.

Figure 15:
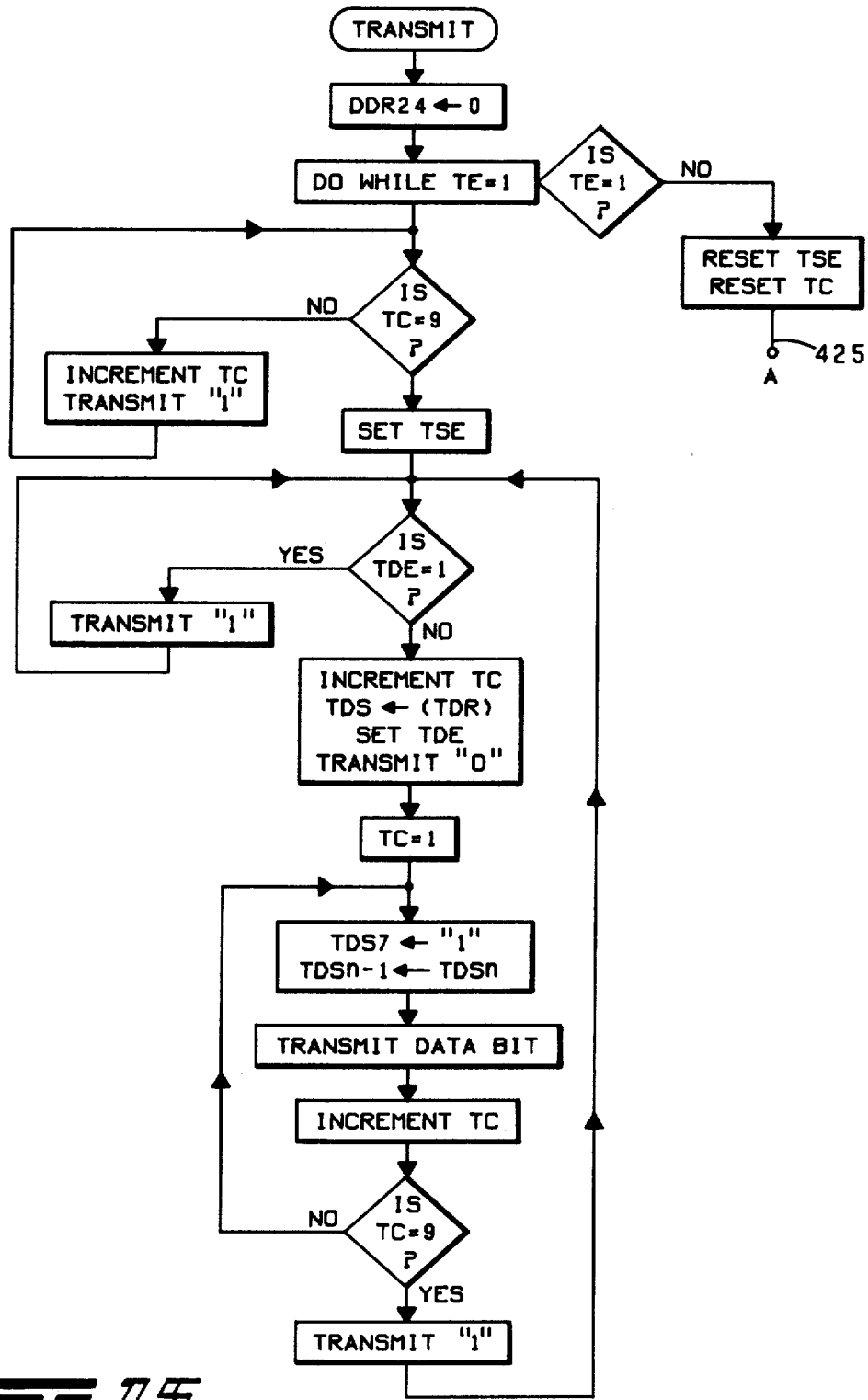
FIG. 15 represents a flowchart of the serial I/O communication logic operating in the half-duplex transmission mode.

Reference may be made to the flow chart of FIG. 15 for a summary of the operation in the half-duplex transmission mode. When TE is set the transmit pin P24 is configured to output by holding DDR24 at zero. As long as TE is set CPU operation of both DDR24 and P24 is inhibited.

Setting TE also releases the transmitter bit counter (TC) from reset. TC counts continuously during TE=1 at the T$\ominus$ clock rate, but will hold at the 9-count as long as status bit TDE remains set. Transmission synchronization is established when TSE sets during the 9-count. When the interrupt caused by TDE=1 is serviced, a new data word is loaded into the Transmit Data Register 37 and TDE is reset. Resetting TDE allows TC to resume counting.

Transmission begins at the middle of the TC 10-count when TSH 426 (FIG. 8A) clocks the start bit into the formatting flip-flop TDST 112 (FIG. 8J). The data word is transferred from the Transmit Data Register 37 to the Transmit Shift Register 38 at the end of the 10-count. If the data is to be transmitted in the biphase format the TDST toggle that would normally have occurred at the end of the TC 10-count is inhibited, thus establishing the transmitted data bit boundaries at the mid-points of each TC counter state. In the NRZ format the transmitted bit boundaries are also established at the mid-points of each TC counter state, but here the controlling factor is that TDST can only change state on the trailing edge of the next TSH clock which occurs after TDS$\phi$ changes state, i.e. the TSH clock which occurs between TS$\ominus$ clocks.

RECEIVE OPERATION

The receive operation is enabled by first configuring the Rate and Mode Control Register 45 and then writing a 1 to the RE bit in the Control and Status Register 46. In the NRZ format, the receiver is immediately ready to accept data. In biphase format, however, it is necessary to present an idle line (toggling at half-bit times) to the receiver for at least one bit time to permit synchronization to occur.

The receiver bit interval is divided into 8 sub-intervals for internal synchronization. In the standard, nonbiphase mode, the received bit stream is synchronized to the leading edge of the first 0 (space) encountered.

The approximate center of each bit time is strobed during the next 10 bits. If the tenth bit is not a 1 (stop bit), a framing error is assumed, and bit ORFE is set. Note that RDRF is not set for a framing error. If the tenth bit is a 1, the data is transferred to the Receive Data Register 36, and interrupt flag RDRF is set. If RDRF is still set at the next tenth bit time, ORFE will be set, indicating an over-run has occurred. When the CPU 1 responds to either flag (RDRF or ORFE) by reading the Control and Status Register 46 followed by reading the Receive Data Register 36, RDRF (and ORFE) will be cleared.

In the biphase mode, it must be determined whether a transition interval is more or less than 6 of the 8 sub-intervals. Pairs of short intervals are defined as 1's, while long intervals are defined as 0's. If RE is set during a string of 1's, the receiver cannot distinguish between bit and mid-bit boundaries. Proper bit synchronization occurs at the first long (zero) transition interval. Synchronization to byte boundaries occurs when eight 1's followed by a zero are received.

Figure 16:
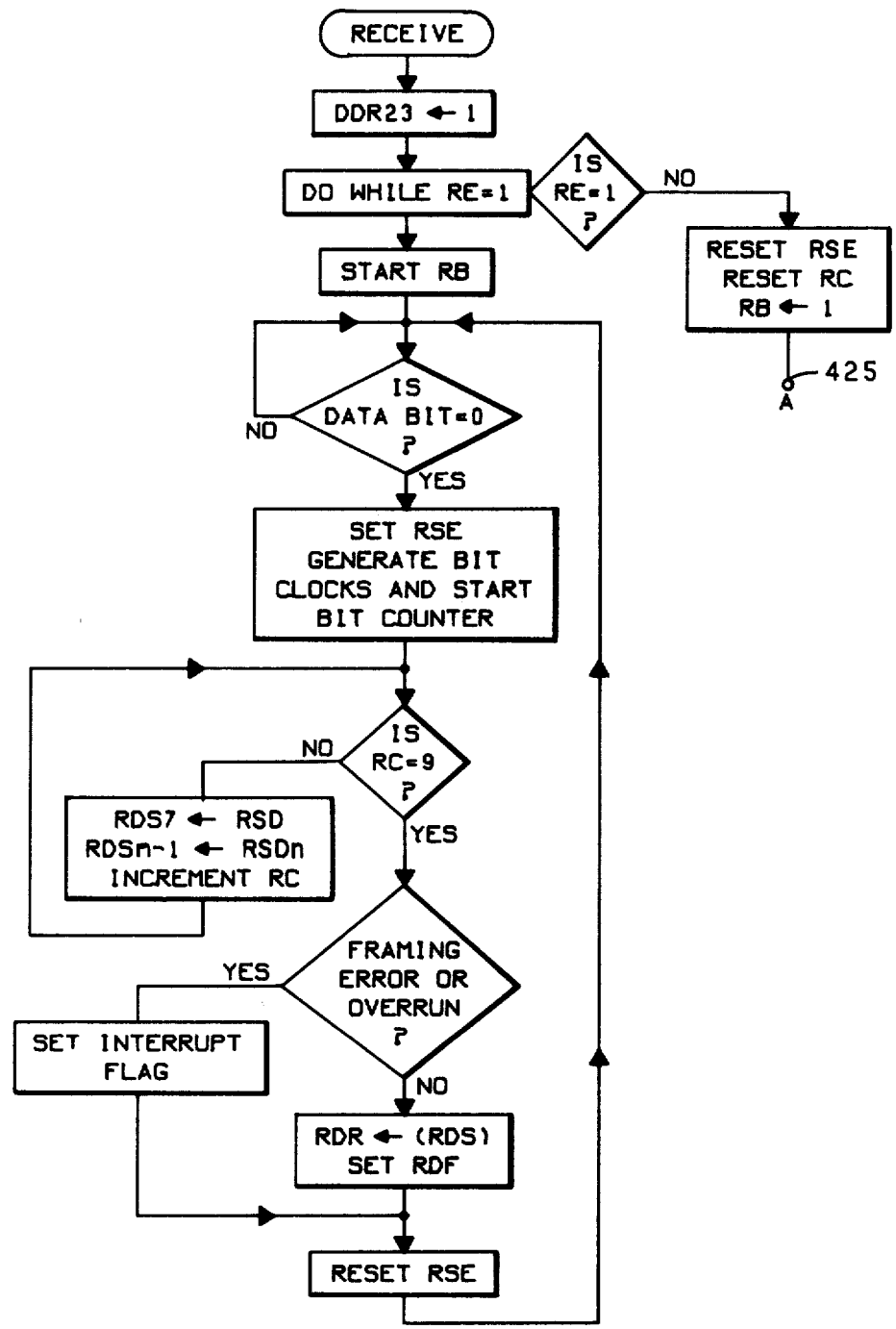
FIG. 16 represents a flowchart of the serial I/O communication logic operating in the half-duplex reception mode.

Reference may be made to FIG. 16 for a summary of the operation in the receive half-duplex mode. When RE is set, the receive data pin, P23, is configured to input by holding DDR23 at "1". As long as RE remains set CPU operation of both DDR23 and P23 is inhibited. Setting RE also allows the RB Register 31 to start clocking in the data on the input line. The remaining receive mode description is separated into NRZ operation and biphase operation.

NRZ receiver operation begins when the idle lines goes to zero indicating arrival of the start bit. Receiver synchronization is established by setting RSE at approximately the middle of the start bit. R$\ominus$ is derived logically from the RB Register 31 which runs continuously as long as RE is set. R$\ominus$ clocks the Receive Shift Register 34 and the receiver bit counter RC. In the NRZ format the separation flip-flop RSD 111 (FIG. 8J) acts merely as another bit of the Receive Shift Register 34 to hold the stop bit, and it is clocked by RBD $\oplus$ RBE, which leads R$\ominus$ by $\frac{1}{4}$ bit time.

In NRZ reception the incoming start bit is input to the RB Register 31 to synchronize one frame by setting RSE 102 (FIG. 8I). For the next nine bits of the frame RB Register 31 toggles to generate R$\ominus$ and the RSD clock. The data stream is clocked into RSD 111, the Receive Shift Register 34, and RST 250. If no framing error exists the eight data bits are transferred to the Receive Data Register 36, and the RBF status bit is set to indicate receipt of one correct word. If a framing error has occurred or if a previous RDF has not been serviced and reset the OR status bit is set to indicate an overrun. RSE resets the RC 10-count.

Biphase receiver operation begins with receipt of a "zero" which has been preceded by at least one "one". Receiver synchronization is established by setting RSE 102 at approximately the middle of the start bit. RSH and RLG are derived logically from the RB Register and are used to control the separation flip-flop SEP 101. The separation logic generates the receiver bit clock R$\ominus$ which drives the receiver bit counter RC. RSH clocks the RSD flip-flop 111 which transforms the biphase data format to the NRZ format. From this point on the Receive Shift Register 34 and RDST 35 function as in the NRZ format mode of operation, with the exception that RSE 102 does not automatically reset during the 10-count and set during the start bit.

A full duplex operation is initiated by setting both RE and TE. The operation of the transmitter is independent of the receiver except for the data format and rate.

WAKE-UP OPERATION

Figure 6:
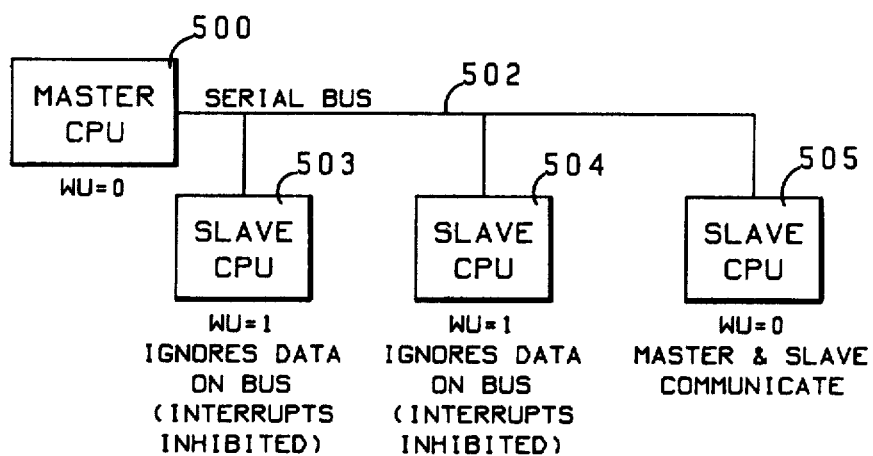
FIG. 6 illustrates a multi-processor configuration illustrating one embodiment of the present invention.

The wake-up capability is intended to increase the throughput of the CPU in multi-processor applications by permitting non-interested CPU's on a common line to ignore the remainder of a message being transmitted. A processor wishing to invoke the wake-up feature sets the wake-up bit (WU) in the Control and Status Register 46. With the wake-up bit set, the receiver section continues to process messages, but does not set the RDRF flag bit. This effectively masks the message from the processor. Upon receiving ten consecutive 1's, the receiver section clears the wake-up bit, thus enabling normal flag operation. Refer to FIG. 6 wherein a master CPU 500 communicates with only Slave CPU 505. Slave CPUs 503 and 504 ignore the message on serial bus 502.

It is important to consider the duties of the transmitter processor during wake-up operation. A "message" is considered to consist of a string of characters transmitted in such a manner that the transmission line does not go idle within the message for a period sufficient for a receiver in wake-up operation to clear its wake-up bit. The wake-up bit is cleared (or reset) by a string of ten consecutive ones. It is important to realize that both data and the stop bit count in the total of ten ones. Software servicing the transmitter will store the next character in the Transmit Data Register 37 upon detecting that TDRE is equal to "1". The transmission line will be kept busy shifting out the current character for 10 bit times (1 start bit, 8 data bits, 1 stop bit) at which time the line will go idle if the transmitter has not been serviced. If the last byte transmitted was all ones (SFFi.e. $FF_{16}=11111111$), the transmitter has a total of 10 bit times to respond to the TDRE flag before a receiver will see ten consecutive ones. If the most significant bit of the data was a zero, the transmitter service routine has a total of 12 bit times to respond to the TDRE flag before affecting the wake-up bit. These two cases represent the minimum and maximum response times required by the transmitter service routine in order to keep the receivers in wake-up.

After the last character of a given message has been sent, it is also the duty of the transmitter to idle the line for the required time before beginning the next message. The time required is data-dependent, as are the response times. If the last byte sent was all ones, the transmitter must wait a total of 12 bit times (after servicing the TDRE flag) before beginning the next message. The maximum wait is required if the most significant bit of the last byte transmitted was a zero. With this condition, the transmitter must wait a total of 20 bit times before beginning the next message.

A receiver service routine wishing to invoke the wake-up mode usually makes this decision after determining that it is not an addressee for a particular message. The receiver routine may then effectively ignore the remainder of the message by setting the wake-up bit. It is important to realize that the wake-up bit cannot be set if the transmission line is idle. With the wake-up bit set, the RDRF flag bit will not be set during the remainder of the message. Providing that RDRF flag bit is clear, the ORFE bit will also be inhibited by wake-up.

If wake-up is invoked without clearing the RDRF flag bit, the ORFE bit will be set upon receipt of the next character of the current message. When the receiver section detects ten consecutive ones on the transmission line, the wake-up bit will clear and the RDRF flag bit will be set upon receipt of the first character of the next message.

MISCELLANEOUS OPERATIONAL STATES

During reset the microcomputer is set to its initial state and the only active signals are the $\phi_1$ and $\phi_2$ clocks, which run as long as power is applied to the chip. At the end of reset the Timer counter starts operating with the rising edge of the $\phi_2$ clock. In general, initiation of serial I/O operation requires execution of two or three write instructions, but since the serial I/O comes out of reset in the biphase format at the highest data rate, it may be possible to initiate operation with only one write instruction. Sixteen data modes are possible: four data rates (see Table 1) for each of biphase, NRZ (no clock), NRZ (internal clock) and NRZ (external clock).

If at the end of reset the first desired usage of the serial I/O is to receive biphase data at the highest data rate, this mode can be established with one write instruction. Setting RE will establish the reception mode. Since the RB Register 31 begins filling up with "ones" as soon as the RT clock starts, at least one idle bit must preceed the start bit to insure generation of an RLG pulse on the leading edge of the start bit. If the start bit happened to be a high value there would be no leading edge to generate the first RLG and synchronization would not be established.

If a mode other than MCR=0 is desired or if the current mode is to be changed, two write instructions must be executed, one for the Rate and Mode Control Register 45, and one for the Control and Status Register 46. The format and data rate are determined by the former, and the duplex and control modes are determined by the latter.

The waveforms of MCR=1, 2, and 3 are the same as those in the case where MCR=0 with the exception that the setting of RE is delayed 5 more $\phi_2$ times, since the Rate and Mode Control Register must be written also. Initiation of NRZ operation (MCR≧4) can occur after reset as soon as RE is set.

In addition to establishing the data, control, and duplex modes it may be necessary to write data to the Transmit Data Register 37. If it is desired to begin transmission as soon as possible, the data word is written to the Transmit Data Register 37, and then the bits of the Control and Status Register 46 should be configured to TDRE=0 and TE=1. Loading the Transmit Data Register before loading the Control and Status Register allows data transfer and data transmission to begin immediately.

If the transmission is to be interrupt-driven TDE is left set, and the interrupt service routine handles the writing of the Transmit Data Register 37.

The serial I/O allows interrupt service routines to monitor its operation. Transmitter interrupts are enabled by setting TIE, and receiver interrupts are enabled by setting RIE.

If a polling operation is desired, interrupts can be disabled by resetting either TIE or RIE or both.

Figure 17:
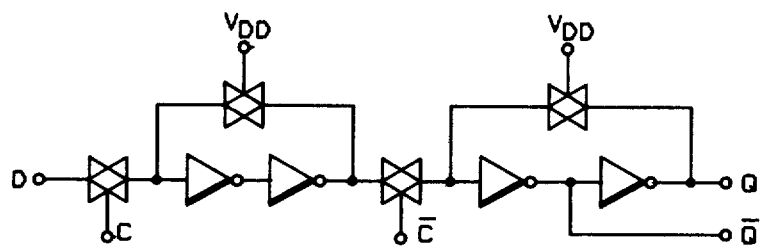
FIG. 17-22 represent detailed circuit schematics of the flip-flops and latches utilized in the logic circuitry of FIGS. 8A-8J.

FIG. 17 illustrates the detailed circuit diagram of the D flip-flops shown in the detailed logic diagram of FIGS. 8A–8J, as, for example, used to implement flip-flops RBA–RBH (291–298) in FIG. 8J.

Figure 18:
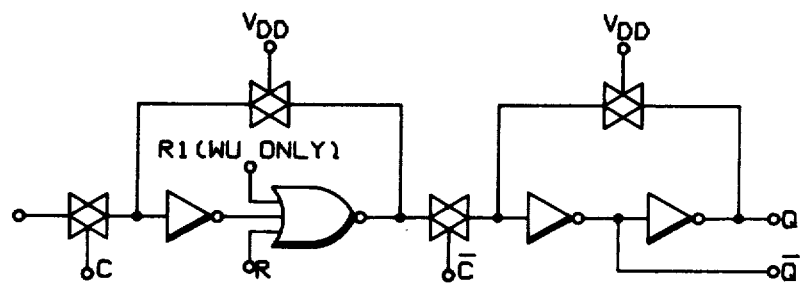

FIG. 18 illustrates a detailed circuit diagram corresponding to the D flip-flops with reset, as used, for example, to implement flip-flops TBA–TBD in FIG. 8A.

Figure 19:
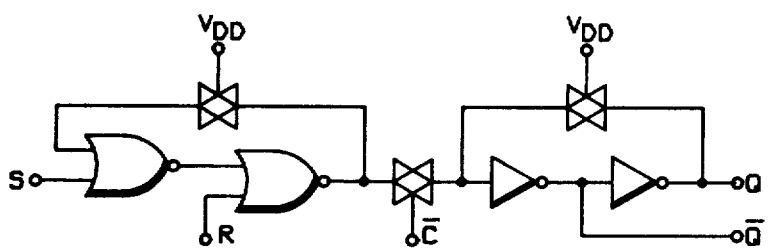

FIG. 19 illustrates a detailed circuit diagram corresponding to the coupled latches with set and reset, as used, for example, to implement flip-flops TSE 427 (FIG. 8B) and RDF 235 (FIG. 8D).

Figure 20:
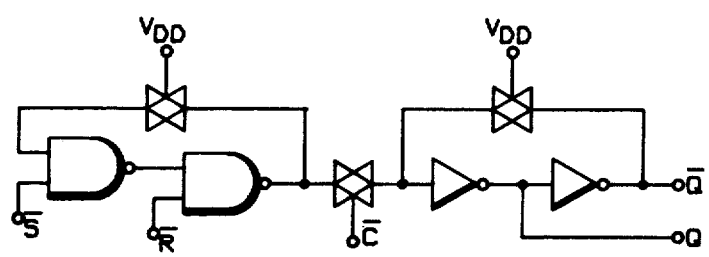

FIG. 20 illustrates a detailed circuit diagram corresponding to the coupled latches with $\overline{S}$ and $\overline{R}$ inputs, as used, for example, to implement flip-flop RSE 102 in FIG. 8I.

Figure 21:
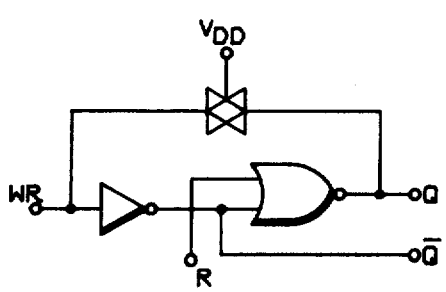

FIG. 21 illustrates a detailed circuit diagram corresponding to the latch with reset used, for example, to implement flip-flops RB0–RB7 in FIG. 8E.

Figure 22:
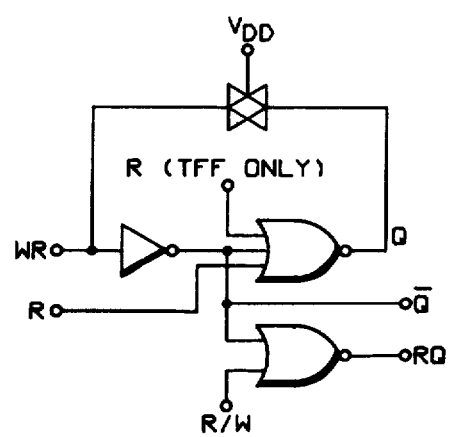

FIG. 22 illustrates a detailed circuit diagram corresponding to the follower latches used, for example, to implement latches RFF, TFF, and ORF in FIG. 8D.

The operation of the serial I/O communication logic illustrated in FIGS. 8A–8J, 10, and 11 may be summarized by the following logic equations:

---

CONTROL SIGNALS $BP = \overline{CC1} \cdot \overline{CC0}$ $R81 = \left( \prod_{n=0}^{7} RDSn \right) \cdot RSD \cdot RDST \cdot R\Theta$ $RSE_S = \overline{BP} \cdot \overline{RBD} \cdot RBE \cdot P23 + BP \cdot LG$ $RSE_R = \overline{RE} + RXFR \cdot (\overline{BP} + SH) + \overline{RCD} \cdot RCE \cdot \overline{RSD} \cdot R\Theta$ $RSE_{\overline{C}} = \overline{R\Theta}$ $RSH = \overline{RBA} \cdot RBF \cdot \overline{RBG} + RBA \cdot \overline{RBF} \cdot RBG$ $RLG = RBA \cdot RBF \cdot \overline{RBG} + \overline{RBA} \cdot \overline{RBF} \cdot RBG$ $SEP_D = \overline{SEP}$ $SEP_R = RLG$ $SEP_C = RSH$ $R\Theta = RLG + RSH \cdot \overline{SEP}$ $RXFR^* = RSE \cdot \overline{RCD} \cdot RCE \cdot RSD \cdot R\Theta$
$RXFR = RXFR^* \cdot \phi_1$ $XFR = RXFR \cdot \overline{RDF}$ $RT = (\overline{CC1} + \overline{CC\phi}) \cdot (\overline{S1} \cdot \overline{S\phi} \cdot T\phi + \overline{S1} \cdot S\phi \cdot T3 + S1 \cdot \overline{S\phi} \cdot T6 + S1 \cdot S\phi \cdot T8) + CC1 \cdot CC\phi \cdot P22$ $TSE_S = \overline{TCD} \cdot TCE \cdot T\Theta$ $TSE_R = \overline{TE}$ $TSE_{\overline{C}} = \overline{T\Theta}$ $TSH = TBC \cdot \overline{TBD} + \overline{TBC} \cdot TBD$ $T\Theta = \overline{TBC \cdot TBD}$
$TS\Theta = T\Theta \cdot (TCA + TCE)$ $TXFR^* = TSE \cdot \overline{TCA} \cdot \overline{TCE} \cdot T\Theta$
$TXFR = TXFR^* \cdot \phi_1$

CONTROL AND STATUS REGISTER $WU_{WR} = PDB\phi \cdot WSR \cdot \overline{Reset}$ $WU_{\overline{C}} = \overline{WSR} \cdot \overline{R\Theta}$ $WU_R = R81 + \overline{RE}$ $RDF_{WR} = RXFR \cdot \overline{Reset} \cdot \overline{WU}$
$RDF_R = RFF \cdot RRD$ $RDF_{\overline{C}} = \overline{RXFR}$ -continued $RFF_{WR} = RDF \cdot RSR$ $RFF_R = \overline{RDF}$
$TDE_{WR} = TXFR + Reset$
$TDE_R = TFF \cdot WTD$
$TFF_{WR} = TDE \cdot RSR$ $TFF_R = \overline{TDE} + Reset$ $OR_{WR} = (RDF \cdot RXFR + \overline{RCD \cdot RCE \cdot RSD \cdot WU \cdot R\ominus}) \cdot \overline{Reset}$
$OR_R = ORF \cdot RRD$ $OR_{\overline{C}} = \overline{RDF \cdot RXFR + \overline{RCD \cdot RCE \cdot RSD \cdot WU \cdot R\ominus}}$
$ORF_{WR} = OR \cdot RSR$ $ORF_R = \overline{OR}$ $SCR_{nWR} = PDB_n \cdot WSR \cdot \overline{Reset}$  $\quad 1 \leq n \leq 4$
$TE = SCR1$
$TIE = SCR2$
$RE = SCR3$
$RIE = SCR4$
RATE AND MODE CONTROL REGISTER

$MCR_{nWR} = PDB_n \cdot WMR \cdot \overline{Reset}$  $\quad 0 \leq n \leq 3$
$S\phi = MCR\phi$
$S1 = MCR1$
$CC\phi = MCR2$
$CC1 = MCR3$ $MCR_{nC} = \overline{WMR}$
RECEIVE DATA REGISTER

$RDR_{nWR} = XFR \cdot RDS_n$  $\quad 0 \leq n \leq 7$
$RDR_{nR} = Reset$  $\quad 0 \leq n \leq 7$
TRANSMIT DATA REGISTER

$TDR_{nWR} = PDB_n \cdot WTD$  $\quad 0 \leq n \leq 7$
$TDR_{nR} = Reset$  $\quad 0 \leq n \leq 7$
RB REGISTER

$RBA_D = \overline{RE} + BP \cdot P23 + \overline{BP} \cdot \overline{RBH} \cdot (RCA + RCD) +$ $\overline{RCA \cdot RCD} \cdot (\overline{WU} + \overline{RBH}) \cdot P23$
$RBB_D = RBA$
$RBD_D = RBB$
$RBD_D = RBC$
$RBE_D = RBD$
$RBF_D = RBE$
$RBG_D = RBF$
$RBH_D = RBG$
$RBA_C = RBB_C = RBC_C = RBD_C = RBE_C = RBF_C = RBG_C = RBH_C = RT$
TB REGISTER

$TBA_D = \overline{TBD}$
$TBB_D = TBA$
$TBC_D = TBB$
$TBD_D = TBC$
$TBA_R = TBB_R = RBC_R = TDB_R = Reset$
$TBA_C = TBB_C = TBC_C = TBD_C = RT$
RC COUNTER

$RCA_D = RSE \cdot \overline{RCE}$
$RCB_D = RCA$
$RCC_D = RCB$
$RCD_D = RCC$
$RCE_D = RCD$ $RCA_R = RCB_R = RCC_R = RCD_R = RCE_R = \overline{RSE}$
$RCA_C = RCB_C = RCC_C = RCD_C = RCE_C = R\ominus$
TC COUNTER

$TCA_D = \overline{TCE}$
$TCB_D = TCA$
$TCC_D = TCB$
$TCD_D = TCC$
$TCE_D = TCD + TCE \cdot TDE$ $TCA_R = TCB_R = TCC_R = TCD_R = RCE_R = \overline{TE}$
$TCA_C = TCB_C = TCC_C = TCD_C = TCE_C = T\ominus$
RECEIVE SHIFT REGISTER

$RSD_D = BP \cdot SEP + \overline{BP} \cdot P23$

-continued $RSD_R = BP \cdot LG$ $RSD_C = BP \cdot RSH + \overline{BP} \cdot (RBD \oplus RBE)$ $RDS_{\overline{C}} = \overline{RLG \cdot BP \cdot RSH + \overline{BP} \cdot (RBD \oplus RBE)}$
$RDS7_D = RSD$
$RDS_{nD} = RDS(n+1)$  $\quad 0 \leq n \leq 6$
$RDS_{nC} = R\ominus$  $\quad 0 \leq n \leq 7$
$RDST_D = RDS\phi$
$RDST_C = R\ominus$
TRANSMIT SHIFT REGISTER

$TDST_D = "1"$
$TDS7_{WR} = TXFR \cdot TDR7$
$TDS_{nD} = TDS(n+1)$  $\quad 0 \leq n \leq 6$
$TDS_{nWR} = TXFR \cdot TDR_n$  $\quad 0 \leq n \leq 6$
$TDS\phi_{\overline{C}} = \overline{TS\ominus \cdot TXFR}$  $\quad 0 \leq n \leq 7$
$TDS_{nC} = TS\ominus$  $\quad 0 \leq n \leq 7$
$TDST_D = BP \cdot T\ominus \cdot TSE \cdot [(TCA + TCE) \cdot TDS\phi] \oplus TDST]$ $\quad + \overline{BP} \cdot [\overline{TSE} + (TCA + TCE) \cdot TDS\phi]$
$TDST_C = TSH$
OUTPUT SIGNALS

$\overline{TEX} = TBD$
$IRQS = RIE \cdot (RDF + OR) + TIE \cdot TDE$
$PDB_n = R/W \cdot (RDR_n \cdot RDR + SCR_n \cdot SCR)$  $\quad 0 \leq n \leq 7$ $P022 = \overline{\overline{PDB2} \cdot WIO2 \cdot \overline{CC1}} + \overline{TEX \cdot CC1 \cdot \overline{CC\phi}}$ $P023 = \overline{\overline{PDB3} \cdot WIO2}$ $P024 = \overline{\overline{PDB4} \cdot WIO2 \cdot \overline{TE}} + \overline{TDST \cdot TE}$ $P2_n = DDR2 \cdot IN2_n + \overline{DDR2} \cdot P02_n$  $\quad 0 \leq n \leq 4$
$IN2_n = $ data at the pin  $\quad 0 \leq n \leq 4$
DATA DIRECTION REGISTERS

$DDR22 = \overline{\overline{PDB2} \cdot DDR2 \cdot \overline{CC1}} + CC1 \cdot CC\phi + Reset$ $DDR23 = \overline{\overline{PDB3} \cdot DDR2} + RE + Reset$ $DDR24 = \overline{\overline{PDB4} \cdot DDR2 \cdot \overline{TE}} + Reset$
ADDRESSES

$$PS = VMA \cdot \prod_{n=5}^{15} \overline{A_n}$$

$SIO = PS \cdot A_4 \cdot \overline{A_3} \cdot \overline{A_2}$ $P12 = PS \cdot \overline{A_4} \cdot \overline{A_3} \cdot \overline{A_2}$ $MCR = SIO \cdot \overline{A_1} \cdot \overline{A_0}$ $WMR = \overline{R/W} \cdot MCR \cdot \phi_2$ $SCR = SIO \cdot \overline{A_1} \cdot A_0$
$RSR = R/W \cdot SCR \cdot \phi_2$ $WSR = \overline{R/W} \cdot SCR \cdot \phi_2$ $RDR = SIO \cdot A_1 \cdot \overline{A_0}$
$RRD = R/W \cdot RDR \cdot \phi_2$
$TDR = SIO \cdot A_1 \cdot A_0$ $WTD = \overline{R/W} \cdot TDR \cdot \phi_2$ $DDR2 = \overline{R/W} \cdot P12 \cdot \overline{A_1} \cdot A_0$
$RIO2 = R/W \cdot P12 \cdot A_1 \cdot A_0$ $WIO2 = \overline{R/W} \cdot P12 \cdot A_1 \cdot A_0$ It will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

TABLE II
DATA LINK CONFIGURATIONS

| Operation Mode | External Clock | No. Pins Used | Port 2 Pin Configuration | | |
|---|---|---|---|---|---|
| | | | P22 | P23 | P24 |
| BP-Receive | no | 1 | not used | input | not used |
| BP-Transmit | no | 1 | not used | not used | output |
| BP-Full-Duplex | no | 2 | not used | input | output |
| NRZ-Receive | no | 1 | not used | input | not used |
| NRZ-Transmit | no | 1 | not used | not used | output |
| NRZ-Full-Duplex | no | 2 | not used | input | output |
| NRZ-Receive | yes | 2 | input or output | input | not used |
| NRZ-Transmit | yes | 2 | input or output | not used | output |
| NRZ-Full-Duplex | input | 3 | input | input | output |
| NRZ-Full-Duplex | output | 3 | output | input | output |
| Clock Only | output | 1 | output | not used | not used |

What is claimed is:

1. In a microcomputer including a processor, serial I/O communication logic and bus means for coupling said processor to said serial I/O communication logic, said serial I/O communication logic comprising:
control register means coupled to said processor, for storing transmit mode and receive mode signals provided by said processor,
transmitter means coupled to said processor, for receiving and storing data provided periodically by said processor, and for serially transmitting said stored data via a serial output line in either NRZ or biphase format as selected by said transmit mode signal stored in said control register means, and
receiver means coupled to said processor, for serially receiving data via a serial input line in either NRZ or biphase format as selected by said receive mode signal stored in said control register means, storing said received data, and periodically providing said stored data to said processor.

2. The microcomputer recited in claim 1, wherein said
control register also stores transmit enable and receive enable signals provided by said processor,
wherein said transmitter means are operative only in response to said transmit enable signal stored in said control register means, and
wherein said receiver means are operative only in response to said receive enable signal stored in said control register means.

3. The microcomputer recited in claim 1, wherein said
control register also stores transmission rate and reception rate signals provided by said processor,
wherein said transmitter means transmit at a rate selected by said transmission rate signal stored in said control register means, and
wherein said receiver means receive at a rate selected by said reception rate signal stored in said control register means.

4. The microcomputer recited in claim 1, wherein said serial I/O communication logic operates in synchronization with a clock signal, wherein said microcomputer further comprises an internal clock source for generating an internal clock signal and a terminal for receiving an external clock signal from an external clock source, and wherein said control register also stores a clock source signal provided by said processor, said serial I/O communication logic further comprising:
means coupled to said control register for operating said serial I/O communication logic in synchronization with said internal clock signal or said external clock signal as selected by said clock source signal stored in said control register.

* * * * *